(12) United States Patent
Iida et al.

(10) Patent No.: US 7,654,083 B2
(45) Date of Patent: Feb. 2, 2010

(54) AXLE DRIVING APPARATUS FOR A ZERO TURN RADIUS VEHICLE

(75) Inventors: Masaru Iida, Hyogo (JP); Fumitoshi Ishino, Hyogo (JP); Manabu Kawakami, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 427 days.

(21) Appl. No.: 11/560,644

(22) Filed: Nov. 16, 2006

(65) Prior Publication Data
US 2008/0115488 A1 May 22, 2008

(51) Int. Cl.
*F16D 31/02* (2006.01)

(52) U.S. Cl. .............................. 60/456; 60/454; 60/468; 60/487

(58) Field of Classification Search .................... 60/435, 60/439, 454, 456, 464, 468, 487, 488; 180/306, 180/307, 308
See application file for complete search history.

(56) References Cited

U.S. PATENT DOCUMENTS

| | | | | |
|---|---|---|---|---|
| 5,078,222 | A * | 1/1992 | Hauser et al. | 180/308 |
| 5,191,813 | A * | 3/1993 | Havens | 60/487 |
| 5,311,740 | A | 5/1994 | Shiba et al. | |
| 5,440,951 | A | 8/1995 | Okada et al. | |
| 5,456,068 | A | 10/1995 | Ishii et al. | |
| 6,073,443 | A | 6/2000 | Okada et al. | |
| 6,125,630 | A | 10/2000 | Abend et al. | |
| 6,186,028 | B1 * | 2/2001 | Shimizu | 60/454 |
| 6,272,854 | B1 | 8/2001 | Ishii et al. | |
| 6,332,317 | B1 * | 12/2001 | Hauser et al. | 60/464 |
| 6,427,443 | B2 * | 8/2002 | Smothers et al. | 60/488 |
| 6,571,555 | B2 * | 6/2003 | Abend et al. | 60/487 |
| 6,604,359 | B2 * | 8/2003 | Ishii et al. | 60/487 |
| 6,604,601 | B2 * | 8/2003 | Steele | 180/307 |
| 6,739,128 | B2 * | 5/2004 | Boyer et al. | 60/468 |
| 6,779,421 | B2 * | 8/2004 | Arnold et al. | 60/487 |
| 6,910,982 | B2 * | 6/2005 | Okada et al. | 60/488 |
| 6,971,234 | B1 | 12/2005 | Phanco et al. | |
| 7,383,913 | B1 * | 6/2008 | Tsukamoto et al. | 60/487 |
| 2005/0053478 | A1 | 3/2005 | Sakikawa et al. | |
| 2006/0108155 | A1 * | 5/2006 | Irikura | 180/6.24 |

* cited by examiner

*Primary Examiner*—Michael Leslie
(74) *Attorney, Agent, or Firm*—Sterne, Kessler, Goldstein & Fox P.L.L.C.

(57) ABSTRACT

An axle driving apparatus includes a first housing having a plurality of cooling fins, an axle rotatably mounted in the first housing, a hydraulic stepless speed change assembly disposed within the first housing. The axle driving apparatus also includes a second housing having a plurality of cooling fins, an axle rotatably mounted in the second housing, a hydraulic stepless speed change assembly disposed within the second housing. A connecting means, such as a bar and/or plate connects the first and second housings. The plurality of cooling fins on the first housing has a different configuration that the plurality of cooling fins on the second housing.

26 Claims, 25 Drawing Sheets

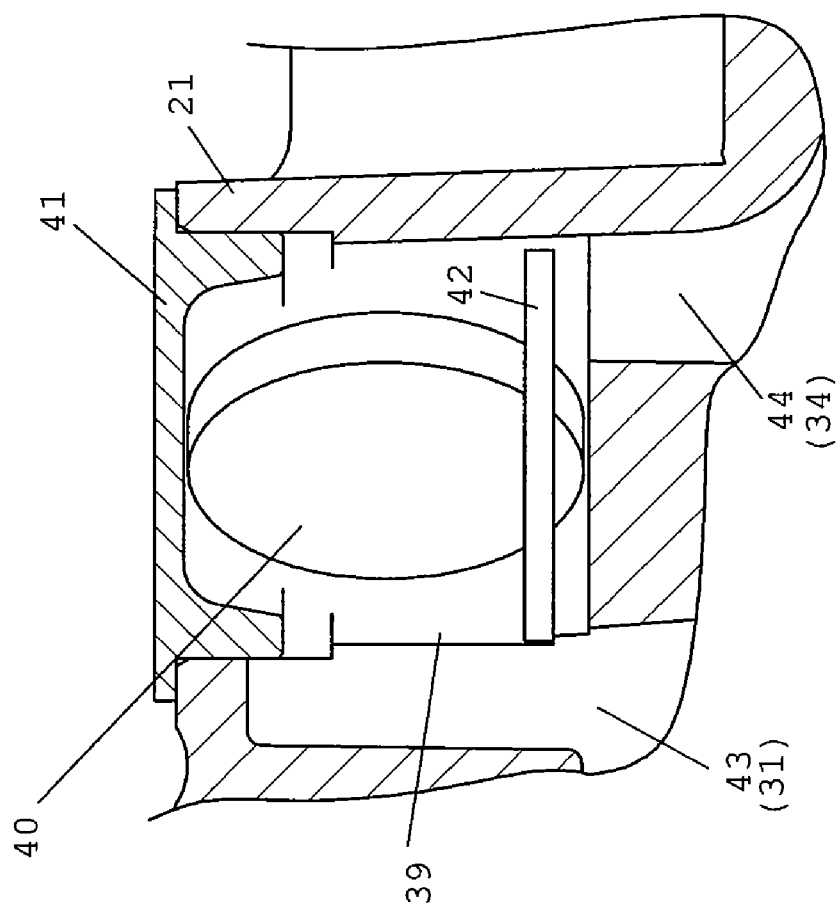

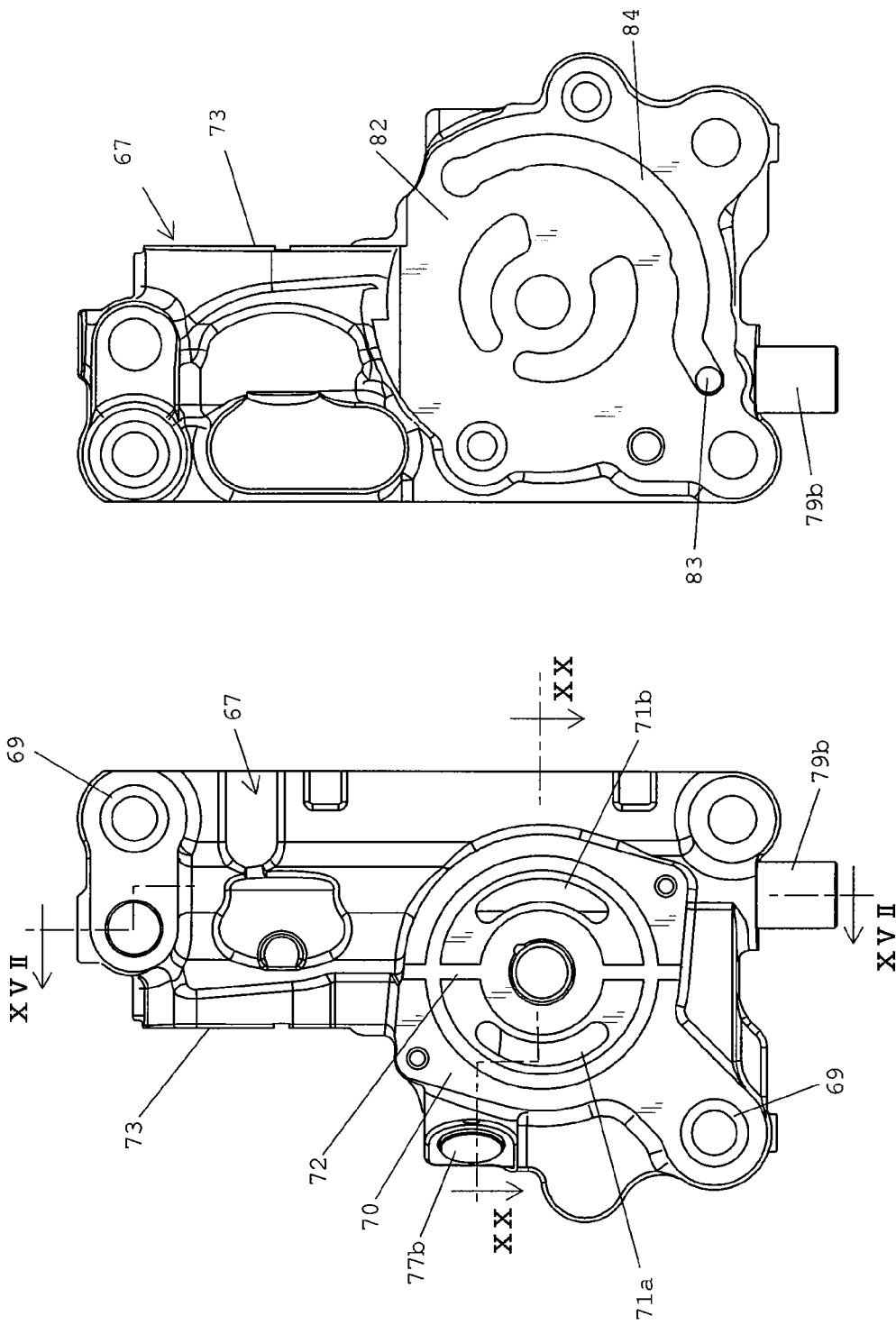

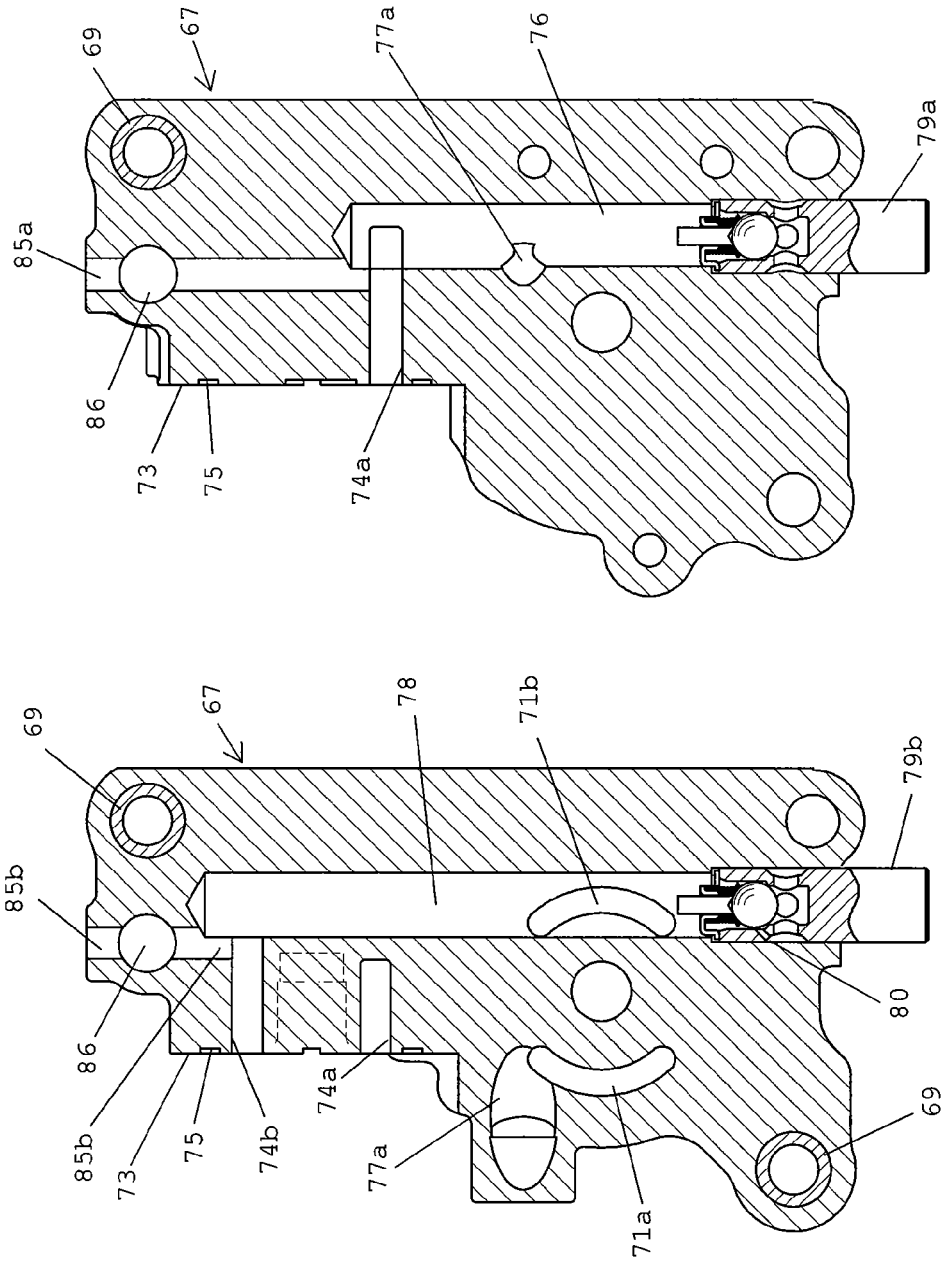

AXLE DRIVING APPARATUS FOR A ZERO TURN RADIUS VEHICLE

BACKGROUND OF THE INVENTION

Field of the Invention

The invention relates to an axle driving apparatus designed to drive a zero turn radius vehicle.

Background Art

An axle driving apparatus having a hydrostatic transmission (HSTs) is generally known in the art. An HST includes a center section on which is mounted a hydraulic pump and a hydraulic motor. The hydraulic pump and the hydraulic motor each carry a plurality of reciprocating pistons that are in fluid communication through porting formed in the center section. As the hydraulic pump rotates, the pump pistons move axially as they bear against an adjustable swash plate where the degree of axial movement depends upon the angular orientation of the swash plate. Axial movement of the pump pistons forces the hydraulic fluid through the porting, which forces the motor pistons against a thrust bearing to thereby rotate the hydraulic motor. As the hydraulic motor rotates, hydraulic fluid is returned to the hydraulic pump through the porting. In this manner, the rotation of the hydraulic pump is translated to the hydraulic motor and the rotation of the hydraulic motor may be used to drive an axle or a pair of axles through a differential. In the case of a transaxle, both left and right wheels are driven together so the speed cannot be independently controlled. This results in a larger turning radius, making it difficult to make close turns. When used in lawn or garden tractors, it is difficult to move close to trees or other obstacles.

Alternatively, there can be one HST for each wheel so that each wheel can be driven independently. Such zero turn HSTs provide for independent control of each of the drive wheels. Improvements and modifications are frequently being made to HSTs with a zero turn radius.

BRIEF SUMMARY OF THE INVENTION

Disclosed herein is an axle driving apparatus of a first embodiment that includes a first housing having a first plurality of cooling fins; a first axle, having a first longitudinal axis, rotatably mounted in the first housing; a first hydraulic stepless speed change assembly disposed within the first housing, the first hydraulic stepless speed change assembly including a first hydraulic pump having a first input shaft, said first input shaft having a rotational axis substantially perpendicular to said first axle, and including a first hydraulic motor having a first output shaft drivingly connected to said first axle; a second housing having a second plurality of cooling fins; a second axle, having a second longitudinal axis, rotatably mounted in the second housing; a second hydraulic stepless speed change assembly disposed within the second housing, the second hydraulic stepless speed change assembly including a second hydraulic pump having a second input shaft, said second input shaft having a rotational axis substantially perpendicular to said second axle, and including a second hydraulic motor having a second output shaft drivingly connected to said second axle; and a connecting means connecting the first and second housings. The first plurality of cooling fins and the second plurality of cooling fins have different configurations.

Further, the first plurality of cooling fins may be bent at an angle different from an angle at which the second plurality of cooling fins are bent.

The axle driving apparatus may also include a first hydraulic PTO unit having a first charge pump, wherein the first hydraulic PTO unit is connected to a first plurality of auxiliary ports in the first housing.

Further, the second housing may have a second plurality of auxiliary ports.

The axle driving apparatus may also include a second hydraulic PTO unit having a second charge pump, wherein the second hydraulic PTO unit is connected to the second plurality of auxiliary ports.

Further, the second plurality of auxiliary ports may be closed off.

The axle driving apparatus may also include a first input pulley disposed on the first input shaft and a second input pulley disposed on the second input shaft.

The axle driving apparatus may also include a first spline collar surrounding the first input shaft; a first bearing support surrounding the first spline collar; a second spline collar surrounding the second input shaft; and a second bearing support surrounding the second spline collar. The first input pulley may be disposed on the first bearing support and the second input pulley may be disposed on the second bearing support.

The axle driving apparatus may also include a first input pulley; a first cooling fan mounted on the first input shaft; a first wave washer located between the first input pulley and the first cooling fan; a second input pulley; a second cooling fan mounted on the second input shaft; and a second wave washer located between the second input pulley and the second cooling fan.

The axle driving apparatus may also include a first oil sump formed in the first housing, wherein the first hydraulic stepless speed change assembly is at least partially immersed in the first oil sump; a first reserve tank; a first siphon allowing flow in both directions between the first oil sump and the first reserve tank; a second oil sump formed in the second housing, wherein the second hydraulic stepless speed change assembly is at least partially immersed in the second oil sump; a second reserve tank; and a second siphon allowing flow in both directions between the second oil sump and the second reserve tank.

The axle driving apparatus may also include a first detachable oil filter associated with the first housing and a second detachable oil filter associated with the second housing.

The axle driving apparatus may also include a first removable lid for accessing the first detachable oil filter and a second removable lid for accessing the second detachable oil filter.

Further, the first detachable oil filter may be positioned on a bottom surface of a first housing and the second detachable oil filter may be positioned on a bottom surface of a second housing.

Alternatively, the first detachable oil filter may be positioned on a rear side of a first housing and the second detachable oil filter may be positioned on a rear side of a second housing.

Further, the first hydraulic pump may be mounted within the first housing a first preselected distance from the first axle and the first hydraulic motor may be mounted within the first housing a second preselected distance from the first axle, the second preselected distance being greater than the first preselected distance. In addition, the second hydraulic pump may be mounted within the second housing a third preselected distance from the second axle and the second hydraulic motor may be mounted within the second housing a fourth preselected distance from the second axle, the fourth preselected distance being greater than the third preselected distance.

The axle driving apparatus may also include a first rotary bypass valve assembly disposed in the first housing, the first rotary bypass valve assembly including a first rotary shaft having a first end extending from the housing and at least two oil holes and including a first bypass arm connected to the first end of the first rotary shaft for rotating the first rotary shaft to connect and disconnect the at least two oil holes with oil drain ports connected to the first hydraulic motor. The axle driving apparatus may also include a second rotary bypass valve assembly disposed in the second housing, the second rotary bypass valve assembly including a second rotary shaft having a first end extending from the second housing and at least two oil holes and including a second bypass arm connected to the first end of the second rotary shaft for rotating the second rotary shaft to connect and disconnect the at least two oil holes with oil drain ports connected to the second hydraulic motor.

Further, the first hydraulic stepless speed change assembly may include a first counter shaft with a first braking mechanism and the second hydraulic stepless speed change assembly may include a second counter shaft with a second braking mechanism.

Further still, the first hydraulic stepless speed change assembly may further include a third counter shaft and the second hydraulic stepless speed change assembly may further include a fourth counter shaft.

The axle driving apparatus may also include a first magnet located in the first housing; a second magnet located in the first housing; a third magnet located in the first housing; a fourth magnet located in the second housing; a fifth magnet located in the second housing; and a sixth magnet located in the second housing.

Further, the first housing may have a first chamber, a second chamber and an opening between the first chamber and the second chamber; the first magnet is located in the first chamber; the second magnet is located in the second chamber; and the third magnet is located in the opening between the first chamber and the second chamber. In addition, the second housing may have a third chamber, a fourth chamber and an opening between the third chamber and the fourth chamber; the fourth magnet is located in the third chamber; the fifth magnet is located in the fourth chamber; and the sixth magnet is located in the opening between the third chamber and the fourth chamber.

The axle driving apparatus may also include a first check valve located in the first speed change assembly; a second check valve located in the first speed change assembly; a third check valve located in the first speed change assembly; a fourth check valve located in the second speed change assembly; a fifth check valve located in the second speed change assembly; and a sixth check valve located in the second speed change assembly.

Further, the first check valve may be located in a first oil passage in the first hydraulic pump, the second check valve may be located in a second oil passage in the first hydraulic pump, the fourth check valve may be located in a third oil passage in the second hydraulic pump, and the fifth check valve may be located in a fourth oil passage in the second hydraulic pump.

Further still, the axle driving apparatus may include a first charge pump with a first oil groove, wherein the third check valve is located in the first oil groove and a second charge pump with a second oil groove, wherein the sixth check valve is located in the second oil groove.

Further, the connecting means may be a bar and/or a plate.

Also disclosed herein is an axle driving apparatus of a second embodiment that includes a housing; a single axle, having a longitudinal axis, rotatably mounted in the housing; and a hydraulic stepless speed change assembly disposed within the housing, the speed change assembly including a hydraulic pump having an input shaft projecting from the housing, the input shaft having a rotational axis substantially perpendicular to the single axle, and including a hydraulic motor having an output shaft drivingly connected to the single axle. The hydraulic pump is mounted within the housing a first preselected distance from the single axle and the hydraulic motor is mounted within the housing a second preselected distance from the single axle, the second preselected distance being greater than the first preselected distance.

Also disclosed herein is an axle driving apparatus of a third embodiment that includes a housing; a single axle, having a longitudinal axis, rotatably mounted in the housing; a hydraulic stepless speed change assembly disposed within the housing, the speed change assembly including a hydraulic pump having an input shaft projecting from the housing, the input shaft having a rotational axis substantially perpendicular to the single axis, and including a hydraulic motor having an output shaft drivingly connected to the single axle; and a rotary bypass valve assembly disposed in the housing. The rotary bypass valve assembly includes a rotary shaft having a first end extending from the housing and at least two oil holes and includes a bypass arm connected to the first end of the rotary shaft for rotating the rotary shaft to connect and disconnect the at least two oil holes with oil drain ports connected to the hydraulic motor.

Also disclosed herein is an axle driving apparatus of a fourth embodiment that includes a housing; a single axle, having a longitudinal axis, rotatably mounted in the housing; and a hydraulic stepless speed change assembly disposed within the housing. The speed change assembly includes a hydraulic pump having an input shaft projecting from the housing, the input shaft having a rotational axis substantially perpendicular to the single axis; a hydraulic motor having an output shaft drivingly connected to the single axle; and a first counter shaft with a braking mechanism.

Further, the hydraulic stepless speed change assembly may include a second counter shaft.

Further, the braking mechanism may include a fixed friction pad; a movable friction pad having a cam projection; a brake rotor surrounding a gear attached to the first counter shaft and located between the fixed friction pad and the movable friction pad; a rotary brake shaft having a first end having a groove and engaged with the movable friction pad; and a brake arm connected to a second end of a rotary brake shaft for rotating the rotary brake shaft to move the movable friction pad closer to the fixed friction pad and press the brake rotor therebetween.

Also disclosed herein is an axle driving apparatus of a fifth embodiment that includes a housing; a single axle, having a longitudinal axis, rotatably mounted in the housing; a hydraulic stepless speed change assembly disposed within the housing, the speed change assembly including a hydraulic pump having an input shaft projecting from the housing, the input shaft having a rotational axis substantially perpendicular to the single axis, and including a hydraulic motor having an output shaft drivingly connected to the single axle; a first magnet; a second magnet; and a third magnet.

Further, the housing may have a first chamber, a second chamber and an opening between the first chamber and the second chamber; the first magnet located may be in the first chamber; the second magnet may be located in the second chamber; and the third magnet may be located in the opening between the first chamber and the second chamber.

Also disclosed herein is an axle driving apparatus of a sixth embodiment that includes a housing; a single axle, having a longitudinal axis, rotatably mounted in the housing; a hydraulic stepless speed change assembly disposed within the housing, the speed change assembly including a hydraulic pump having an input shaft projecting from the housing, the input shaft having a rotational axis substantially perpendicular to the single axis, and including a hydraulic motor having an output shaft drivingly connected to the single axle; a first check valve; a second check valve; and a third check valve.

Further, the first check valve may be located in a first oil passage in the hydraulic pump and the second check valve may be located in a second oil passage in the hydraulic pump.

Still further, the axle driving apparatus may include a charge pump with an oil groove, wherein the third check valve may be located in the oil groove.

Also disclosed herein is an axle driving apparatus of a seventh embodiment that includes a housing; a single axle, having a longitudinal axis, rotatably mounted in the housing; a hydraulic stepless speed change assembly disposed within the housing, the speed change assembly including a hydraulic pump having an input shaft projecting from the housing, the input shaft having a rotational axis substantially perpendicular to the single axis, and including a hydraulic motor having an output shaft drivingly connected to the single axle; and an input pulley disposed on the input shaft.

Further, the axle driving apparatus may include a spline collar surrounding the input shaft and a bearing support surrounding the spline collar, wherein the input pulley is disposed on the bearing support.

BRIEF DESCRIPTION OF THE DRAWINGS/FIGURES

The above mentioned features of the invention will be more clearly understood from the following detailed description of the invention read together with the drawings in which:

FIG. 13 illustrates a cross-sectional view taken along line XIII-XIII in FIG. 5 of the left transaxle.

FIG. 14 illustrates a top view of the center section.

FIG. 15 illustrates a bottom view of the center section.

FIG. 18 illustrates a cross-sectional view taken along line XVIII-XVIII in FIG. 16 of the center section.

FIG. 19 illustrates a cross-sectional view taken along line XIX-XIX in FIG. 16 of the center section.

DETAILED DESCRIPTION OF THE INVENTION

The axle driving apparatus disclosed herein is designed to drive a vehicle. An exemplary vehicle is shown generally at 1 in FIGS. 1-6. Vehicle 1 is a zero turn radius (ZTR) riding lawn mower. Vehicle 1 includes a body frame 3 movably supported by oppositely disposed drive wheels 10L and 10R. A pair of caster wheels 19L and 19R are secured to a forward portion of body frame 3. Vehicle 1 also has an operator's seat 16, driving and steering control handles 17L and 17R, and a brake pedal 18.

Figure 7:
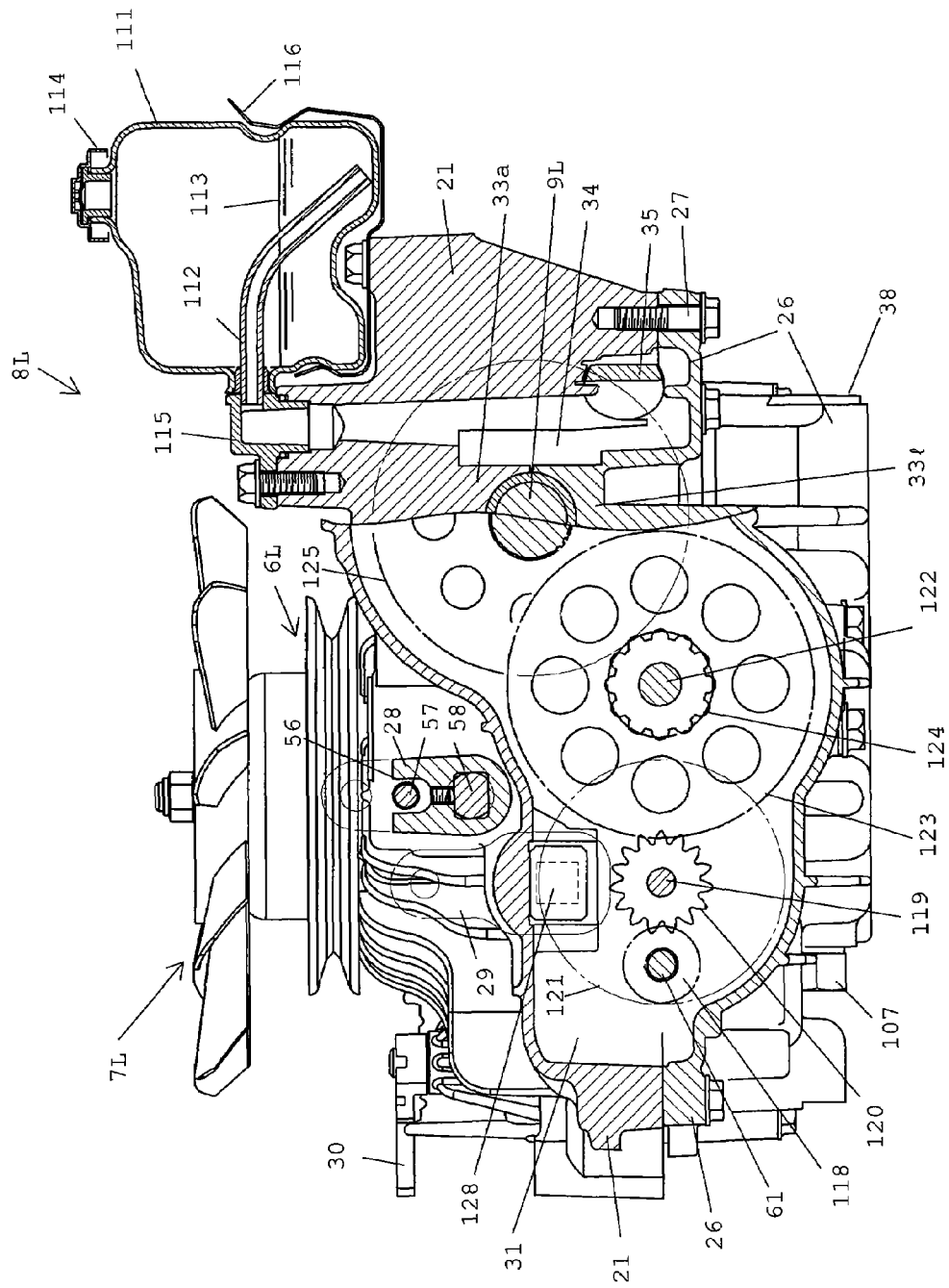
FIG. 7 illustrates a cross-sectional view taken along line VII-VII in FIG. 5 of the left transaxle.

Drive wheels 10L and 10R are rotatably driven by a prime mover, such as engine 2, mounted on body frame 3. Drive wheels 10L and 10R are carried on left and right axle shafts 9L and 9R, respectively, each of which have a wheel mounting flange 9a. Axle shafts 9L and 9R extend from left and right transaxles 8L and 8R, respectively, each of which have a housing 20. Each housing 20, has an upper housing part 21 with frame mounting bosses 22 extending therefrom to attach transaxles 8L and 8R to a mounting stay 3a, which extends downward from body frame 3. A single axle shaft 9L(9R) is placed in each housing 20 defining a longitudinal axis and having a proximal end rotatably mounted in housing 20 and a distal end extending outwardly from a outside wall of housing 20. Each housing 20, also has axle support projections 33U and 33L, as shown in FIG. 7, which help to maintain the location of proximal end of axle shaft 9L(9R). The distal end of axle shaft 9L(9R) extends through a tubular portion formed in upper housing part 21 and is supported by a bearing fitted inside said upper housing 21, then extends outward from housing 20.

A shaft 2a extends downward from engine 2 to drive an output pulley 4, a PTO (power take-off) electric clutch 12, and an output pulley 11. A belt 5 fits around output pulley 4 and input pulleys 6L and 6R, which are located on transaxles 8L and 8R, below cooling fans 7L and 7R, respectively. A belt 13 fits around output pulley 13 and an input pulley 14 that is connected to a shaft 15a extending from a mower 15 positioned beneath body frame 3.

Figure 1:
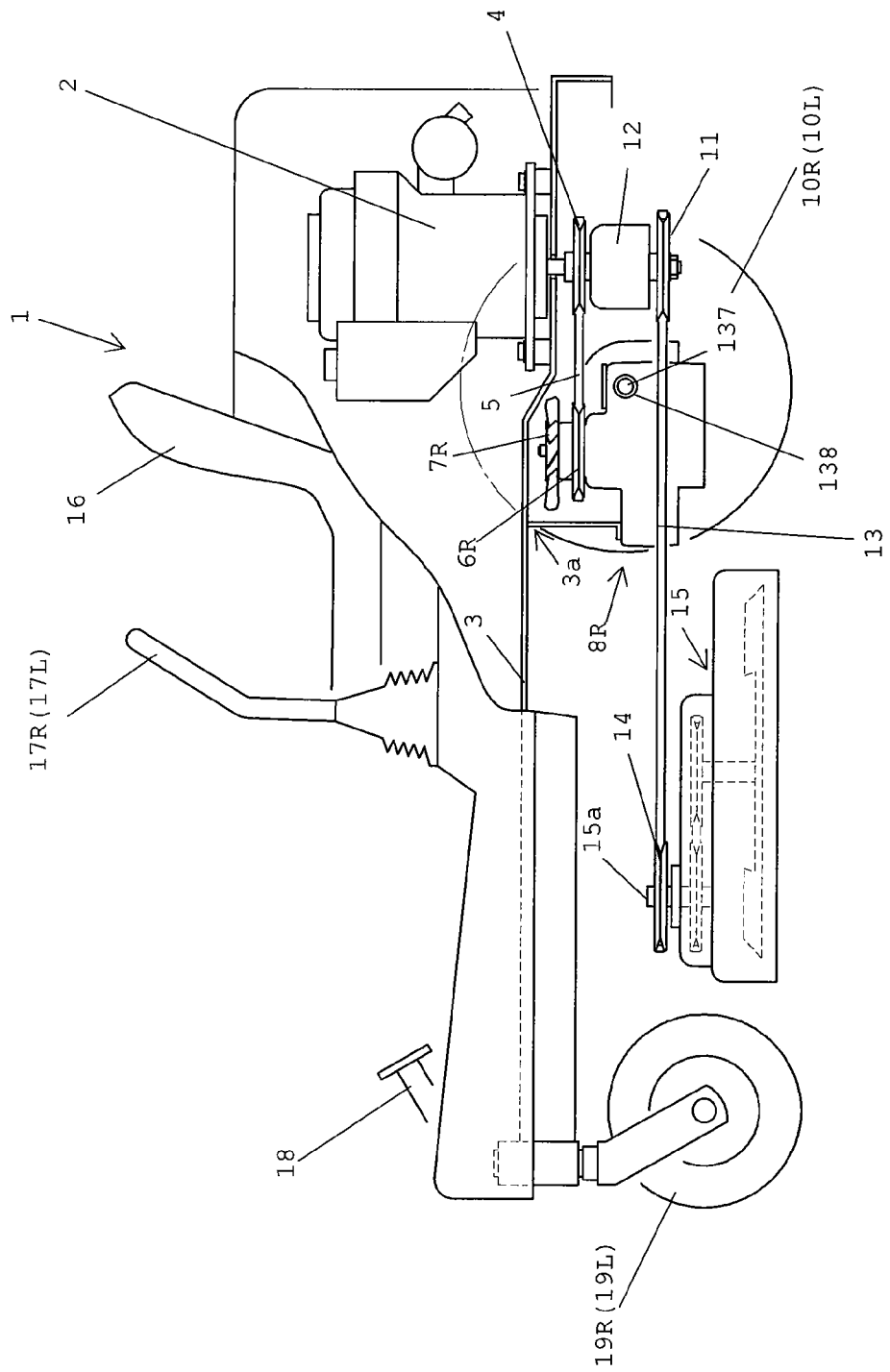
FIG. 1 illustrates a side view, partly in cross-section, of an exemplary working vehicle, such vehicle being an example of one type of vehicle on which an axle driving apparatus disclosed herein can be utilized.
Figure 2:
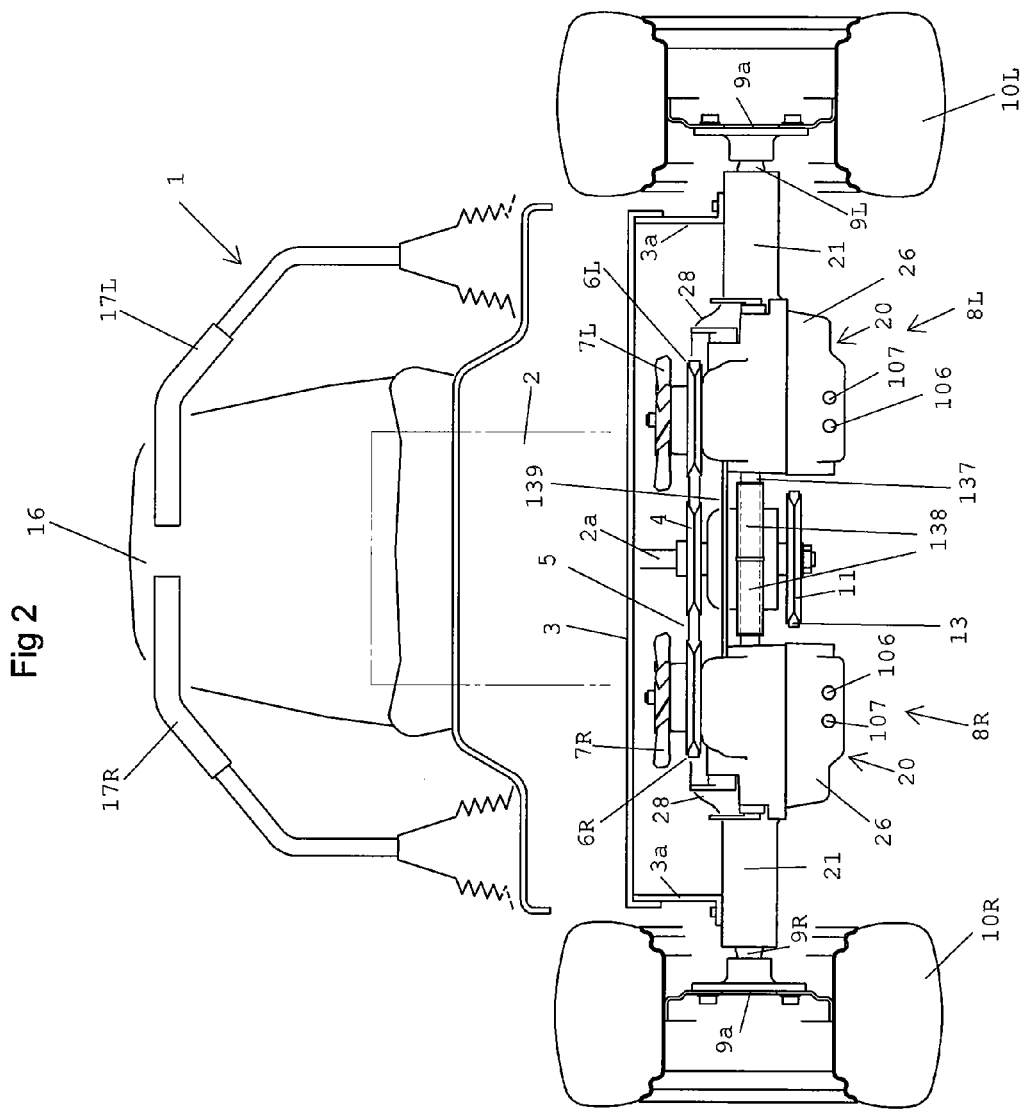
FIG. 2 illustrates a front view of the vehicle.
Figure 3:
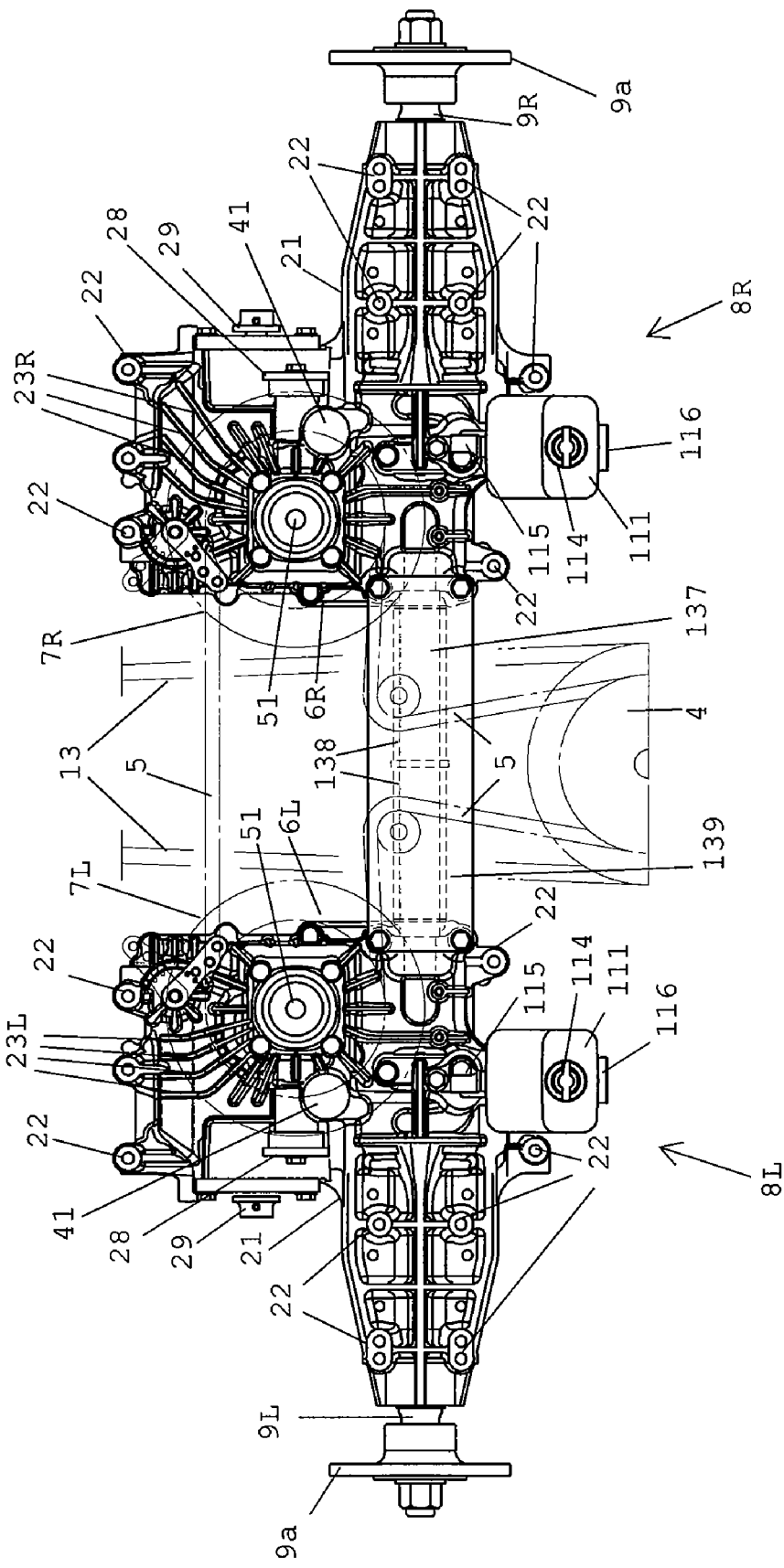
FIG. 3 illustrates a plan view of the vehicle showing the transaxle assembly.
Figure 10:
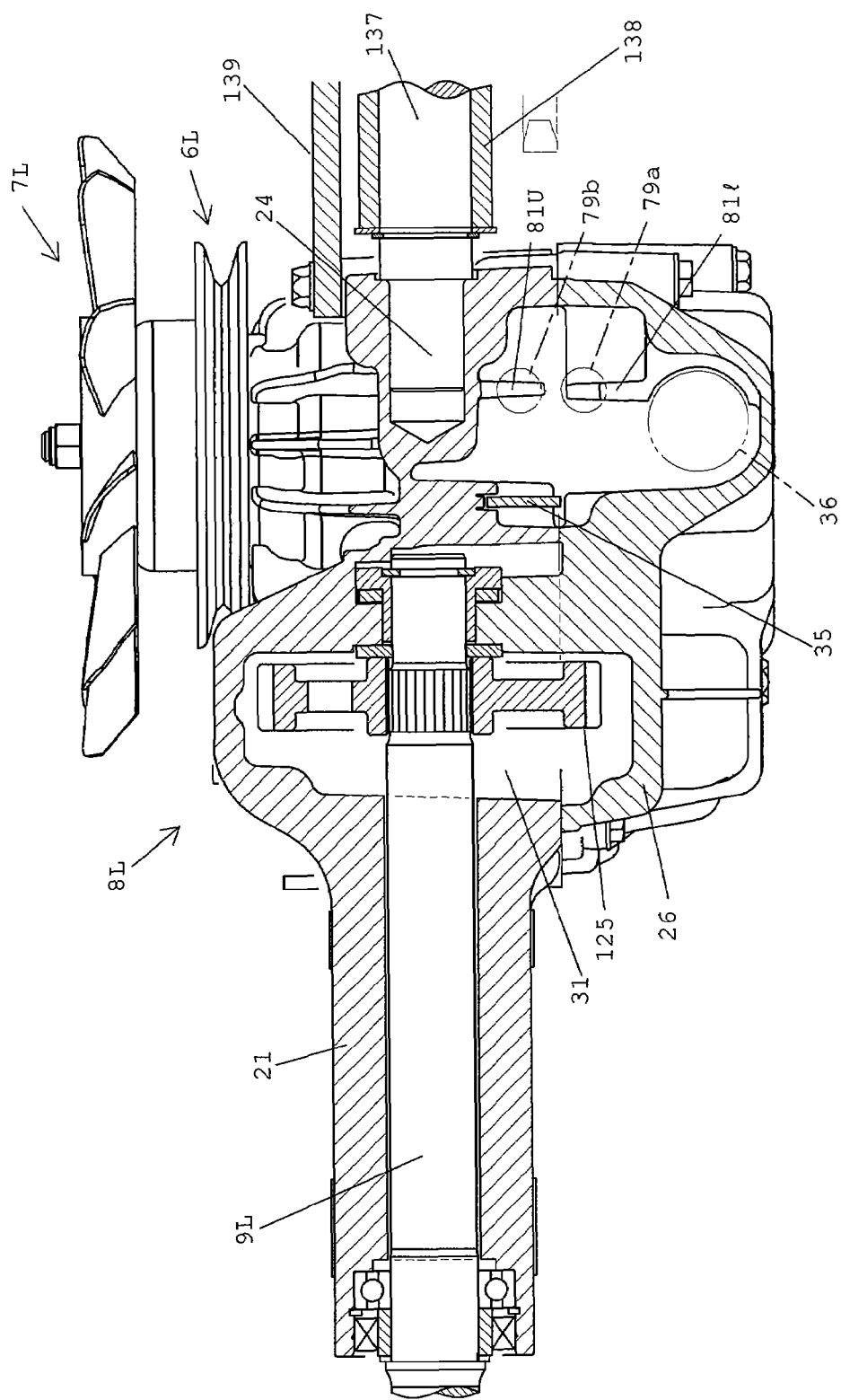
FIG. 10 illustrates a cross-sectional view taken along line X-X in FIG. 5 of the left transaxle.

FIG. 3 illustrates a plan view of a transaxle assembly 5 including transaxles 8L and 8R. Housings 20 of transaxles 8L and 8R are separate and distinct from one another and do not have a shared common housing. Facing side surfaces of upper housing parts 21 of transaxles 8L and 8R are connected together with a connecting bar 137 that extends from openings 24, as shown in FIG. 10, in upper housing parts 21 of transaxles 8L and 8R to span a space between transaxles 8L and 8R. Ends of connecting bar 137 may be pressure fitted or friction fitted into openings 24, which are coaxial to axles 9L and 9R. A pair of hollow tubes 138 are rotatably mounted on connecting bar 137 allowing for contact with belt 13 when mower 15 is lifted up. In addition, upper surfaces of upper housing parts 21 of transaxles 8L and 8R are also connected together via a connecting plate 139 that is bolted to the upper surfaces of upper housing parts 21. Although both are shown, the connecting means between transaxles 8L and 8R may be connecting bar 137 alone, connecting plate 139 alone, or both connecting bar 137 and connecting plate 139. Connecting transaxles 8L and 8R in this fashion leaves a space therebetween that allows for the passage of belt 13 in the space between transaxles 8L and 8R giving the advantage of a greater ground clearance of output pulley 11.

As mentioned above, housings 20 of transaxles 8L and 8R are separate and distinct from one another. Housings 20 are not mirror images of one another and have distinguishing features. For example, cooling fins or ribs 23L and 23R, which extend from an upper surface of upper housing parts 21, may have different configurations and/or profiles from one another. For instance, as shown in FIG. 3 cooling fins or ribs 23L may be bent at a different angle than cooling fins or ribs 23R. The configuration and profile of cooling fins or ribs 23L and 23R optimizes and improves air flow for cooling oil within transaxles 8L and 8R. Cooling fans 7L and 7R rotate together with input pulleys 6L and 6R in the same direction. Cooling fins or ribs 23L and 23R are formed along the direction of cooling air flow for improved cooling efficiency so that the overall profile of right and left transaxles 8L and 8R are asymmetrical.

Transaxles 8L and 8R have the same components and while left transaxle 8L will be described with reference to FIGS. 5-26, right transaxle 8R has the same components. Transaxle 8L has a housing 20 that includes an upper housing part 21 and a lower housing part 26 joined together with bolts 27. Housing 20 has a hydraulic stepless speed change assembly disposed therein. The hydraulic stepless speed change assembly includes a hydraulic variable displacement axial piston pump 50 and a hydraulic fixed displacement axial piston motor 60. A center section 67 is mounted in an enlarged region of housing 40 and has a pump mounting surface 70 for mounting pump 50 thereon and has a motor mounting surface 73 for mounting motor 60 thereon. Center section 67 is attached to upper housing part 21 through a plurality of bolts 68, each of which pass through a hollow dowel pin 69. Dowel pin 69 allows for the correct positioning of center section 67 at a predetermined position. Housing 20 has a first chamber 31 housing a gear train, a second chamber 34 serving as an oil sump, and a third chamber 39, as shown in FIG. 13.

Pump 50 is mounted within housing 20 a first preselected distance from axle 9L and motor 60 is mounted within housing 20 a second preselected distance from axle 9L. The second preselected distance is greater than the firs preselected distance. This may be achieved by having center section 67 be d-shaped such that pump 50 is located between axle 9L and motor 60. The rotational axis of pump 50 located on center section 67 is perpendicular to the rotational axis of axle shaft 9L and the rotational axis of motor 60 located on center section 67 is parallel to the rotational axis of axle shaft 9L in the second chamber 34. This arrangement brings the pump shaft 51 close to engine 2, thereby decreasing the amount of space need to mount transaxle 8L. The arrangement also locates pump shaft 51 substantially in the middle of the housing 20 so that cooling fan 7L located at an external distal end of pump shaft 51 can cover substantially the entirety of housing 20 and thereby efficiently circulate cooling air.

Figure 5:
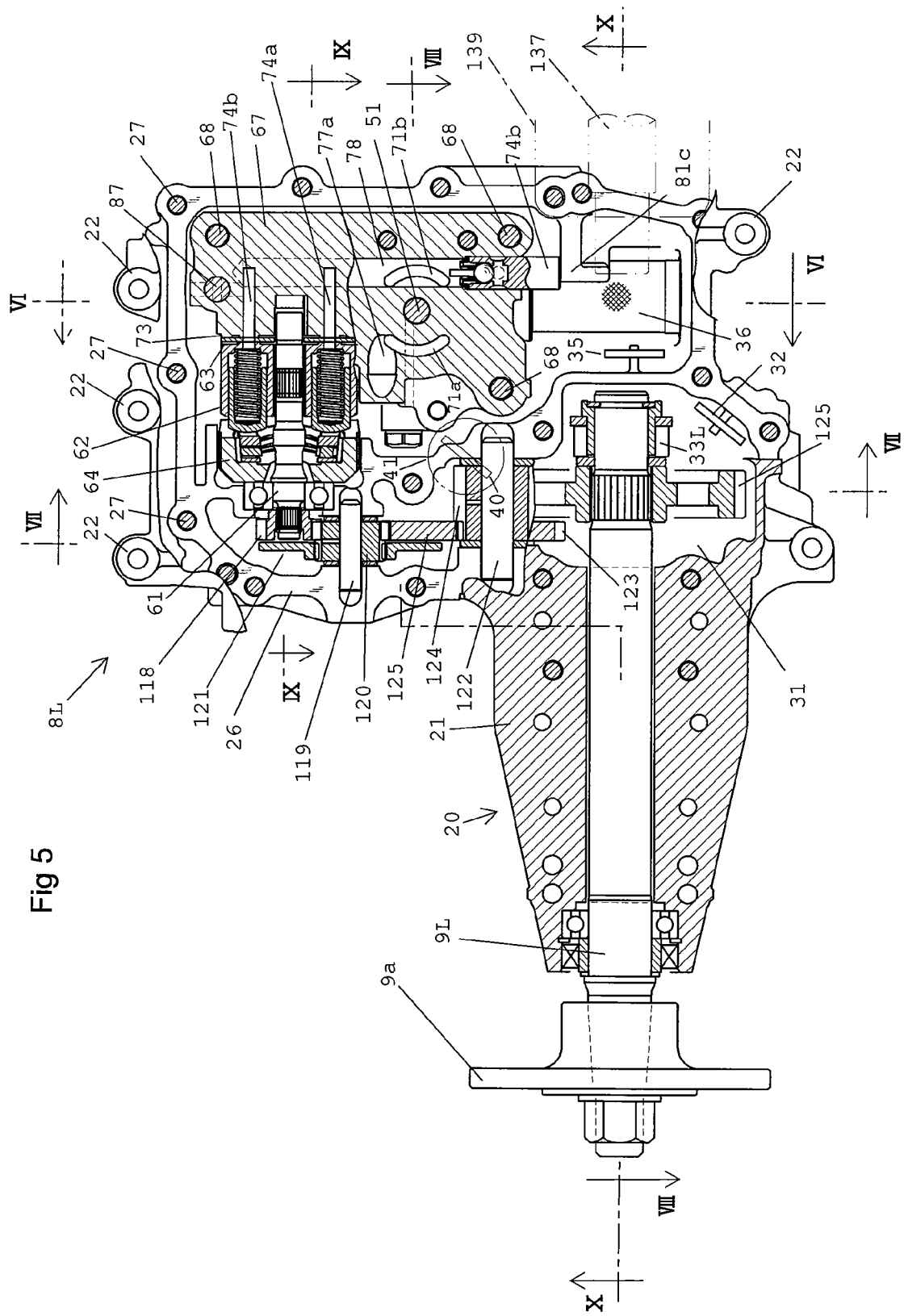
FIG. 5 illustrates a plan view, partially in cross-section, of a left transaxle.

As best seen in FIG. 5, one end of motor 60 is mounted on to motor mounting surface 73 of center section 67 via a valve plate 63 having a pair of openings for communication with kidney ports 74a and 74b. Motor 60 includes a cylinder block 62 which is rotatably disposed on valve plate 63. A plurality of pistons are fitted for reciprocating movement into a plurality of cylinder bores defined in cylinder block 62. The other end of motor 60 has a fixed swash plate 64. The heads of the pistons abut a thrust bearing of the fixed swash plate 64. A motor output shaft 61 extends longitudinally through cylinder block 62 parallel to axle shaft 9L. One end of motor shaft 61 extends through an opening in valve plate 63 and the other end extends through an opening in fixed swash plate 64.

A first counter shaft 119 extends longitudinally parallel to and adjacent to motor shaft 61. A second counter shaft 122 extends longitudinally parallel to and is located between first counter shaft 119 and axle shaft 9L. An output gear 118 is provided on motor shaft 61, which engages with a first reduction gear 120 mounted on first counter shaft 119, which in turn engages with a second reduction gear 123 mounted a pinion gear 124 mounted on second counter shaft 122. Second reduction gear 123 then in turn engages with a bull gear 125 mounted on axle shaft 9L. This gear train transmits the driving force from motor shaft 61 to axle shaft 9L in the first chamber 31.

A braking mechanism is shown in FIGS. 9 and 21-23. A brake rotor 121 engages first reduction gear 120 mounted on first counter shaft 119. Brake rotor 121 rotates with motor shaft 61 between a fixed friction pad 128 and a movable friction pad 130. Fixed friction pad 128 is fitted to upper housing part 21. Movable friction pad 130 is integrally formed at the base of a rotary brake shaft 129 and the movable friction pad 130 has a cam projection 131 projecting from a surface not facing brake rotor. A sleeve 132 is fixed to upper housing part 21 and has an opening that rotary brake shaft 129 extends through. A V-shaped groove 133 is formed at the end of rotary brake shaft 129 where sleeve 132 is located and engages with cam projection 131. The other end of rotary brake shaft 129 not adjacent movable friction pad 130 has a brake arm 29 mounted thereon that extends perpendicular to rotary brake shaft 129 and a return spring 134 surrounding rotary brake shaft 129 such that brake arm 29 is located between return spring 134 and sleeve 132.

When brake pedal 18 is depressed, brake arm 29 is actuated to rotate rotary brake shaft 129, movement of cam projection 131 presses V-shaped groove 133 causing movable friction pad 130 to move towards fixed friction pad 128. This movement causes brake rotor 121 to be clamped between movable friction pad 130 and fixed friction pad 128, stopping movement of brake rotor 121 and in turn first counter shaft 120, thereby resulting in a braking of the gear train. Return spring 134 facilitates quick release of the braking action and movement of spring 134 is limited by limiter pin 135. The illustrated braking mechanism is merely illustrative of one suitable braking mechanism and other suitable braking mechanisms can be utilized if desired.

Figure 6:
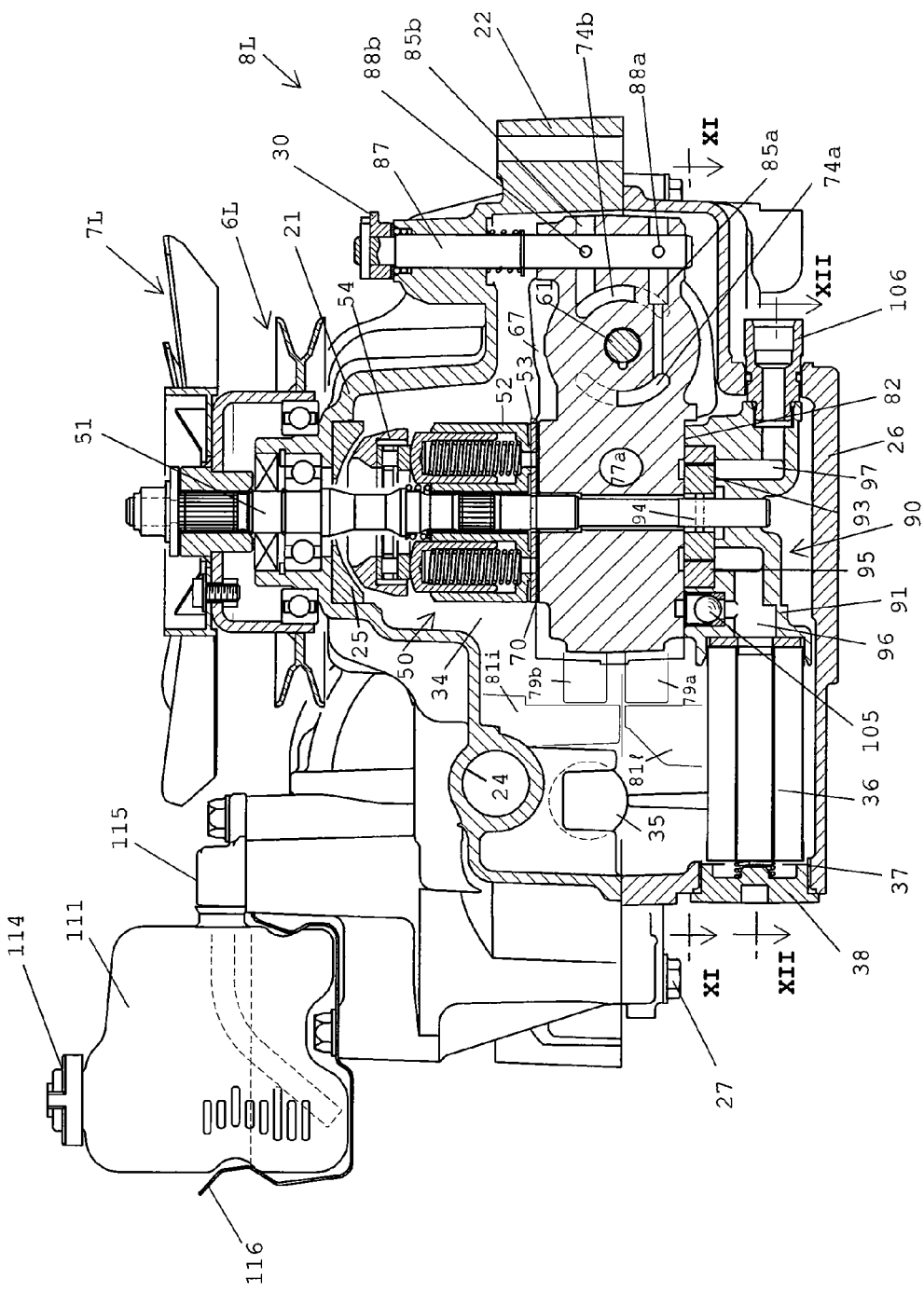
FIG. 6 illustrates a cross-sectional view taken along line VI-VI in FIG. 5 of the left transaxle.

As best seen in FIG. 6, one end of pump 50 is mounted on pump mounting surface 70 of center section 67 via a valve plate 53 that has a pair of openings for communication with kidney ports 71a and 71b. Pump 50 includes a cylinder block 52 rotatably disposed on valve plate 53. Pistons are fitted into a plurality of cylindrical bores of cylinder block 52. The other end of pump 50 has a movable swash plate 54, which may be a cradle-type swash plate. Above movable swash plate 54 is an arcuate guide 25 for movable swash plate 54. Movable swash plate 54 is provided for selectively varying the displacement of hydraulic pump 50. A pump input shaft 51 extends longitudinally through cylinder block 52 and is perpendicular to axle shaft 9L. It will be recognized by those skilled in the art that rotation of pump shaft 51 serves to drive hydraulic pump 52. Pump shaft 51 engages with a spline bore provided on the rotational axis of cylinder block 52 such that cylinder block 52 rotates with pump shaft 51.

Figure 8:
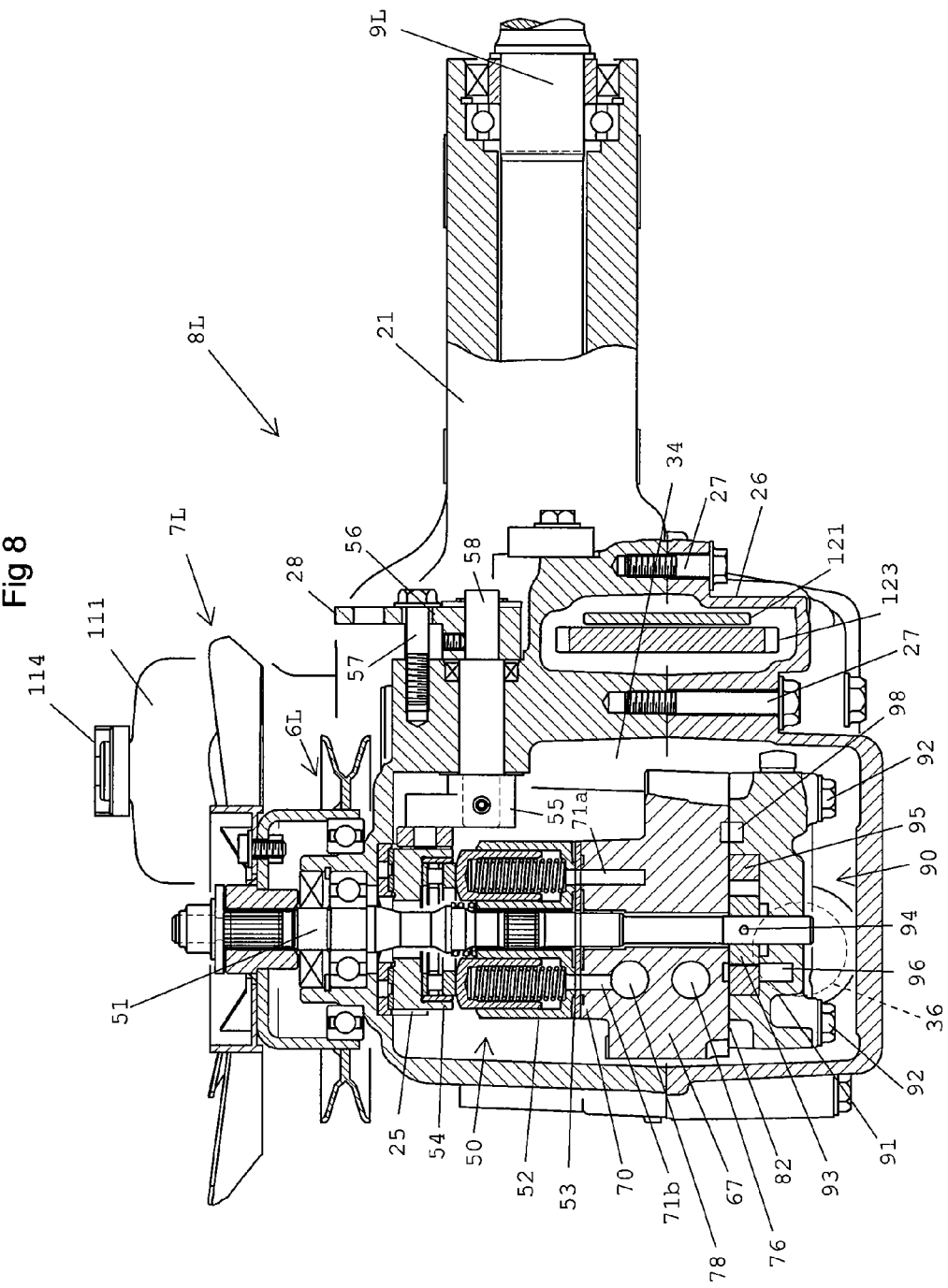
FIG. 8 illustrates a cross-sectional view taken along line VIII-VIII in FIG. 5 of the left transaxle.
Figure 21:
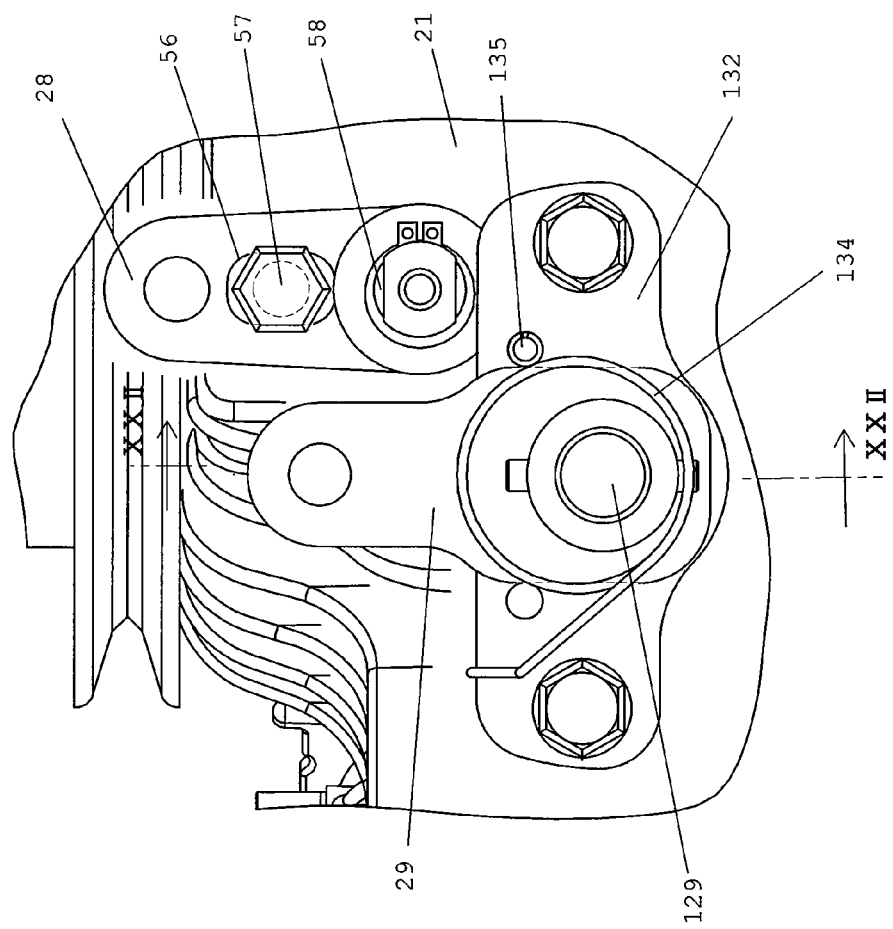
FIG. 21 illustrates a front view of a speed control arm and a bypass arm.
Figure 22:
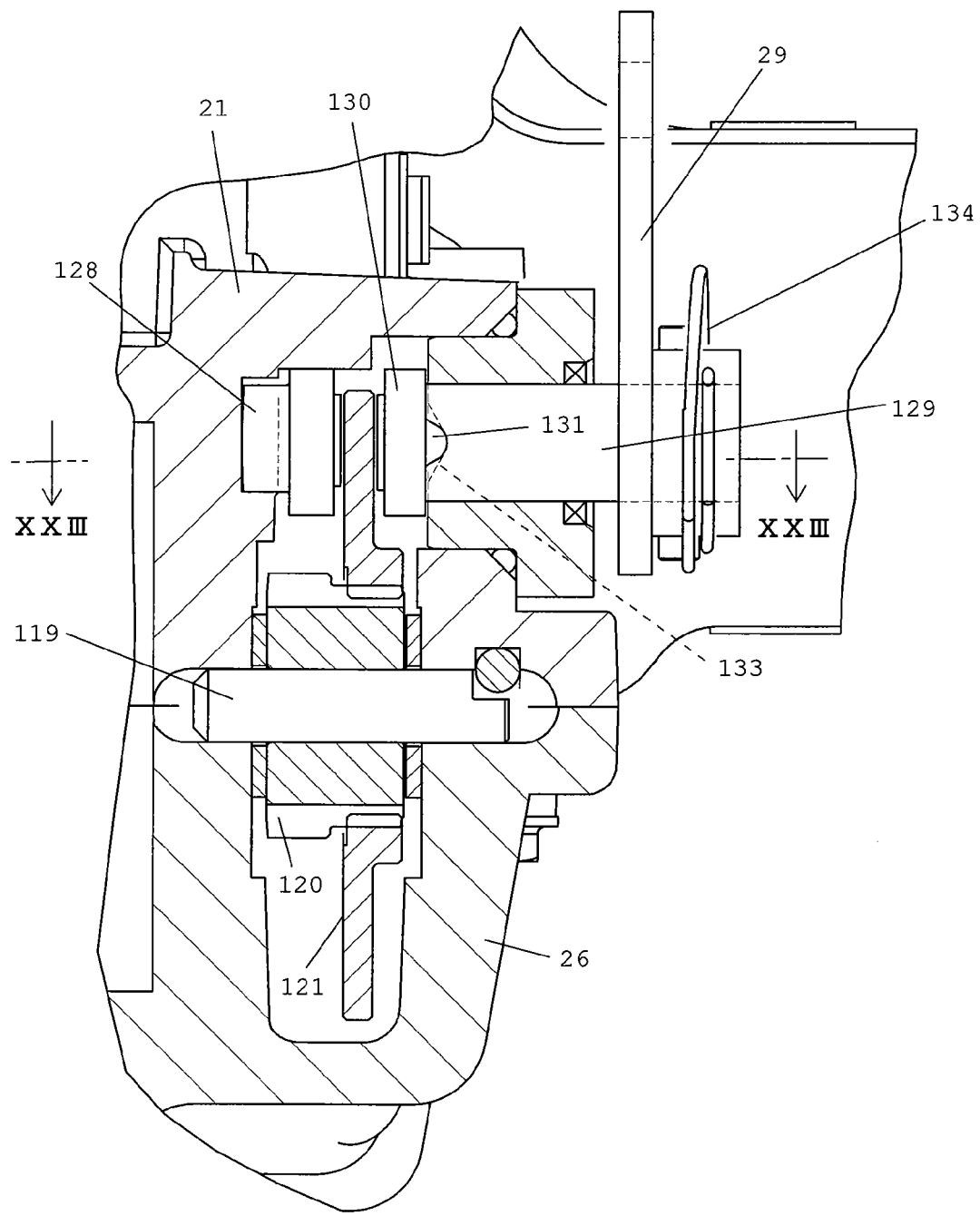
FIG. 22 illustrates a cross-sectional view taken along line XXII-XXII in FIG. 21 of the speed control arm and the bypass arm.
Figure 23:
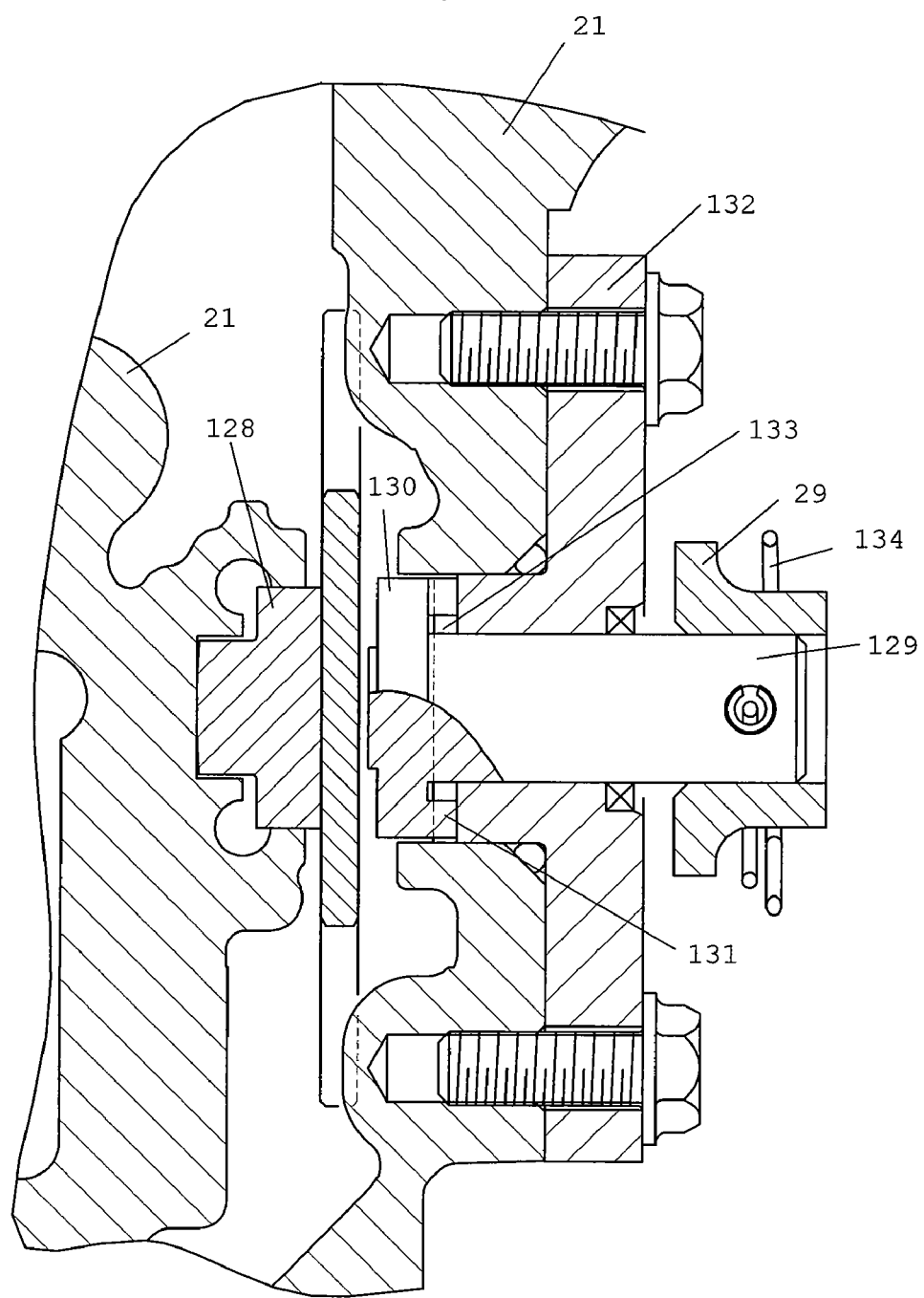
FIG. 23 illustrates a cross-sectional view taken along line XXIII-XXIII in FIG. 22 of the speed control arm and the bypass arm.

As best seen in FIGS. 8 and 21, a connecting arm 55 is attached to movable swash plate 54 at a first end and extends downward therefrom. A first end of a control shaft 58 extends from a second end of connecting arm 55 and a second end of control shaft 58 has a speed control arm 28 disposed thereon. Speed control arm 28 has a slot 56 through which a stopper 57 goes through and attaches to housing 21. Speed control arm 28 is mechanically connected to control lever 17L with one or more rod links or wire cables, such that when control lever 17L is moved forward or backward, speed control arm 28 moves forward or backward. Movement of speed control arm 28 is translated through control shaft 58 to connecting arm 55 and then to movable swash plate 54. Movement of swash plate 54 changes the direction cylinder block 52 rotates and thereby switches the transaxle assembly between forward movement, neutral, and reverse movement. When stopper 57 contacts the end of slot 56, it limits the movement of speed control arm 28.

Figure 24:
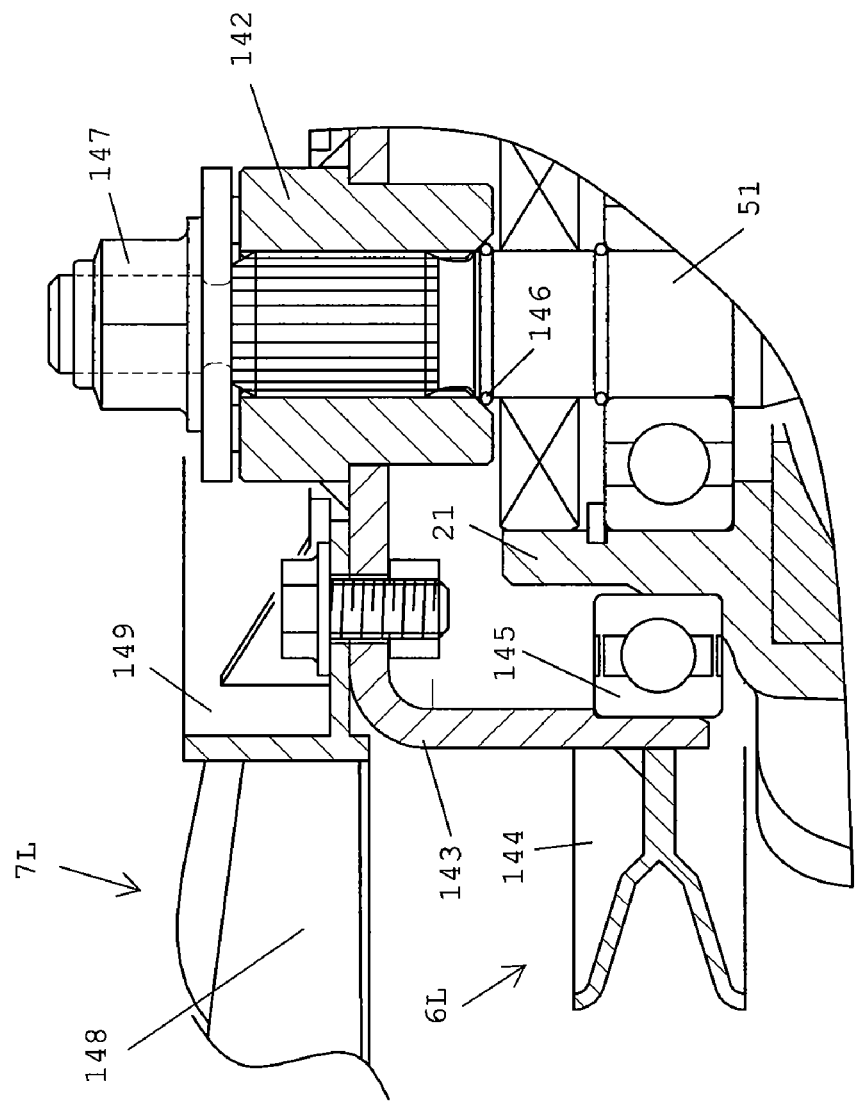
FIG. 24 illustrates a side view of a first embodiment of a pulley and cooling fan attached to a pump shaft.

As best seen in FIG. 24, one end of pump shaft 51 extends from upper housing 21 and through a stop ring 146 and then a spline collar 142, both of which surround pump shaft 51. A bearing support part 143 that may be cup shaped surrounds spline collar 142 and extends downward to cover the opening in upper housing 21 through which pump shaft 51 extends. Bearing support part 143 is separated from upper housing through a bearing 145 having a seal. Input pulley 6L is disposed on an outside of bearing support part 143 such that a rotary part 144 of input pulley 6L faces bearing support part 143. This configuration of disposing input pulley 6L accommodates for the low positioning of engine 2. It is noted that this configuration may also be utilized in an axle driving apparatus other than for driving zero turn radius vehicles.

FIG. 24 illustrates a first embodiment for disposing cooling fan 7L having fan blades 148 and a main body 149 about pump shaft 51. Main body 149 of cooling fan 7L is disposed about spline collar 142 and is attached to bearing support part 143 through bolts 150. In this first embodiment the end of pump shaft 51 extending through spline collar 142 has a nut 147 applied thereto. The rotation of pump shaft 51 rotates spline collar 142, bearing support part 143 with an outer ring of bearing 145, input pulley 6L, and cooling fan 7L.

Figure 25:
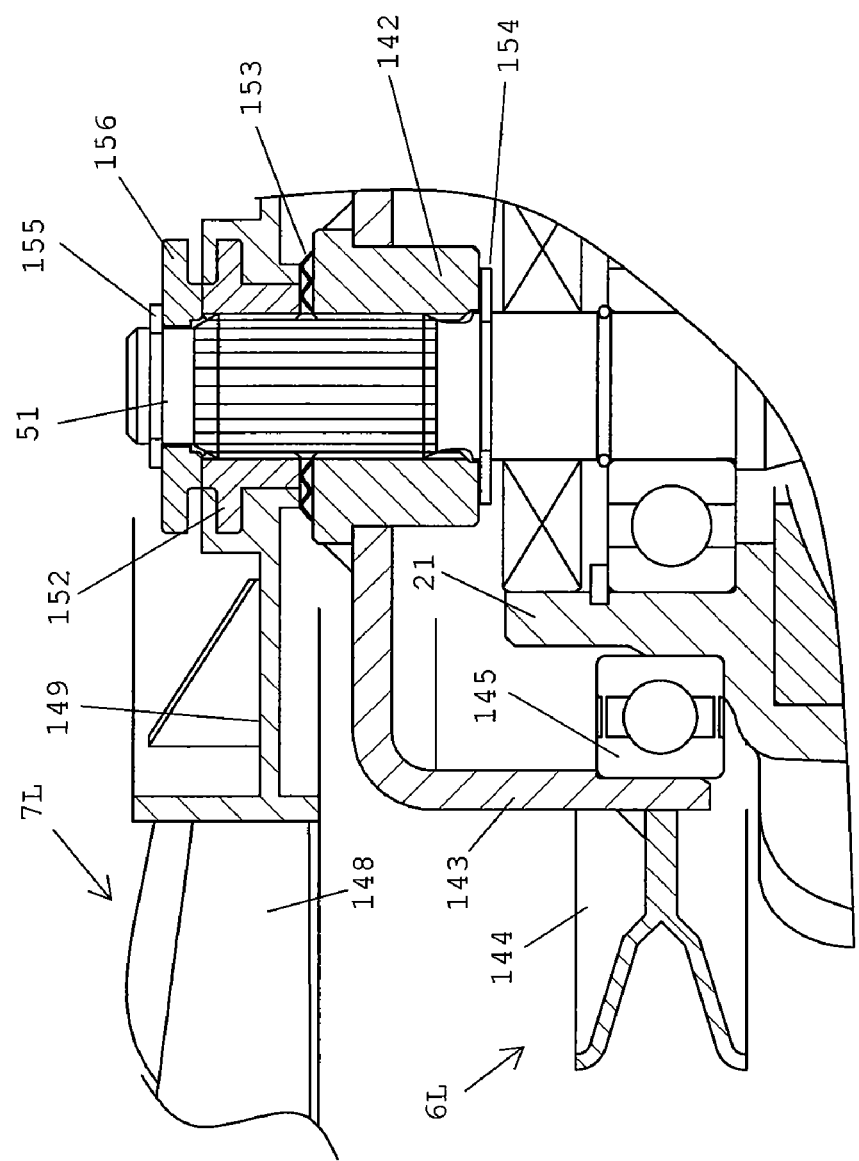
FIG. 25 illustrates a side view of a second embodiment of a pulley and cooling fan attached to a pump shaft.

FIG. 25 illustrates a second embodiment for disposing cooling fan 7L having fan blades 148 and a main body 149 about pump shaft 51. Spline collar 142 rests on a first stop ring 154 and a wave washer 153 surrounding pump shaft 51 rests on top of spline collar 142. A spline hub 152 surrounds pump shaft 51 and is disposed on top of wave washer 153. A main body 149 of cooling fan 7L interlocks with spline hub 152 and a portion also rests on wave washer 153. Wave washer 153 may be a flexible metal and has the advantage of reducing noise between cooling fan 7L and input pulley 6L. A spacer 156 surrounds pump shaft 51 and is disposed on top of spline hub 152 and a second stop ring 155 surrounds pump shaft 51 and is disposed on top of spacer 156. The rotation of pump shaft 51 rotates spline collar 142, bearing support part 143, and input pulley 6L and also rotates spline hub 152 and cooling fan 7L.

Figure 11:
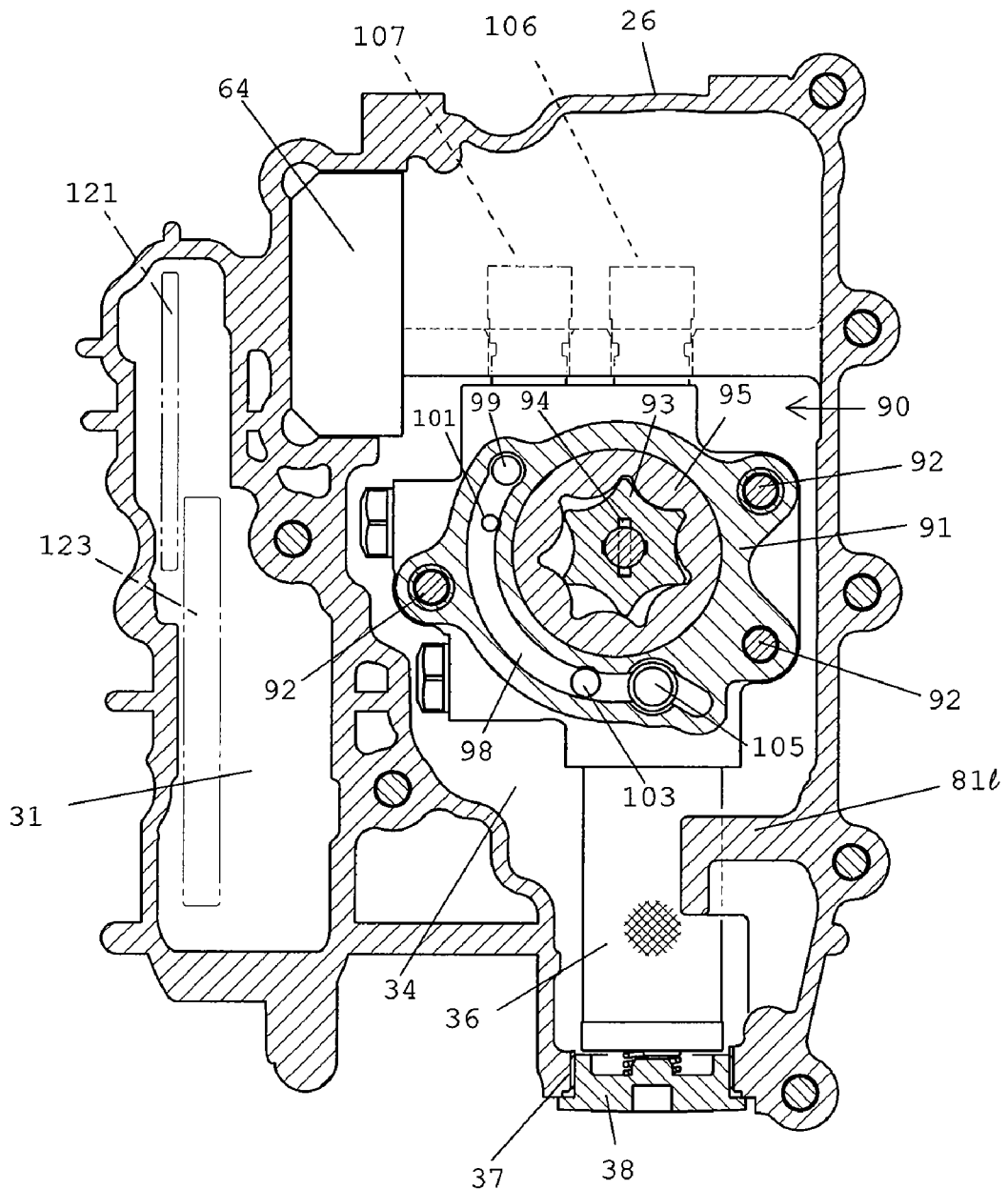
FIG. 11 illustrates a cross-sectional view taken along line XI-XI in FIG. 6 of the left transaxle.
Figure 12:
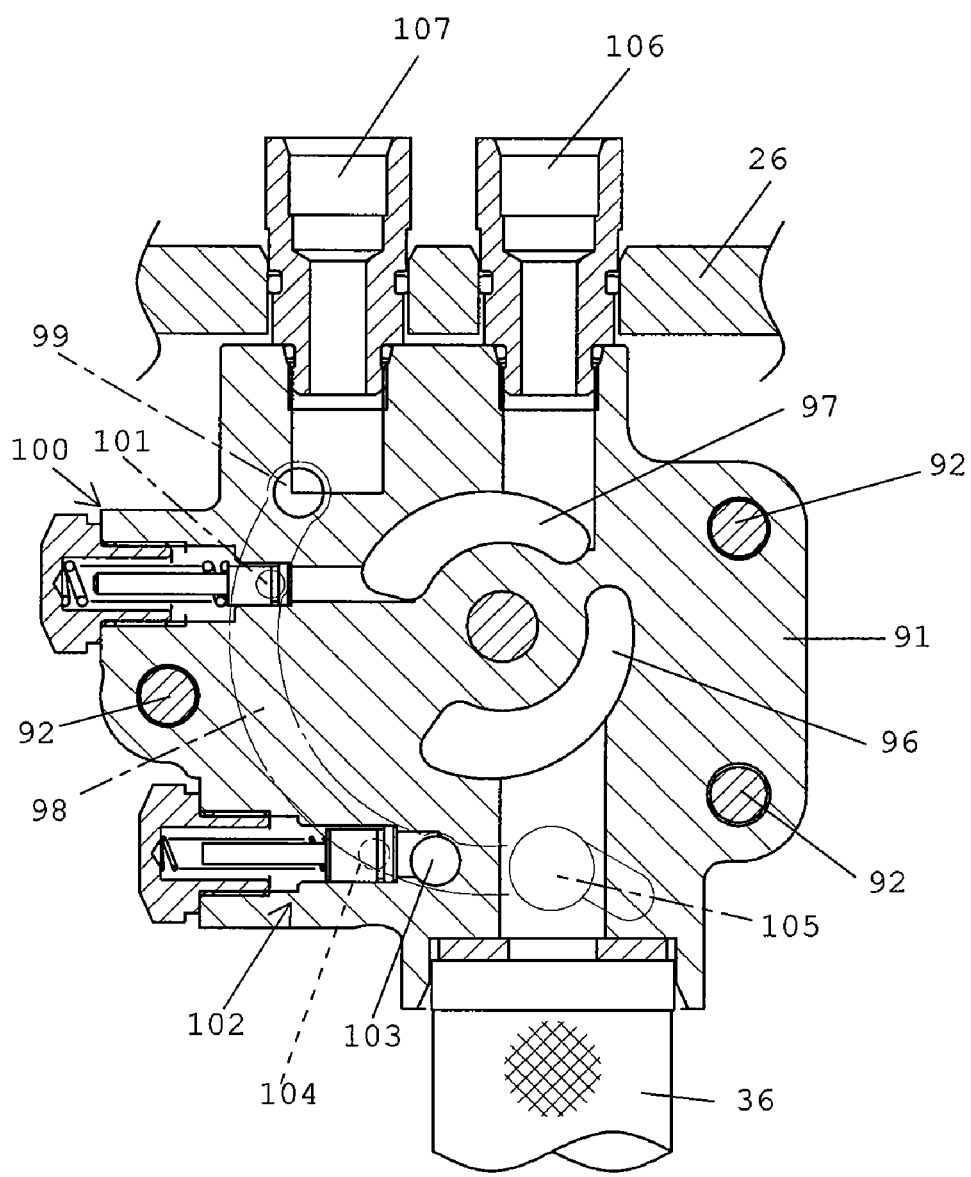
FIG. 12 illustrates a cross-sectional view taken along line XII-XII in FIG. 6 of the left transaxle.
Figure 16:
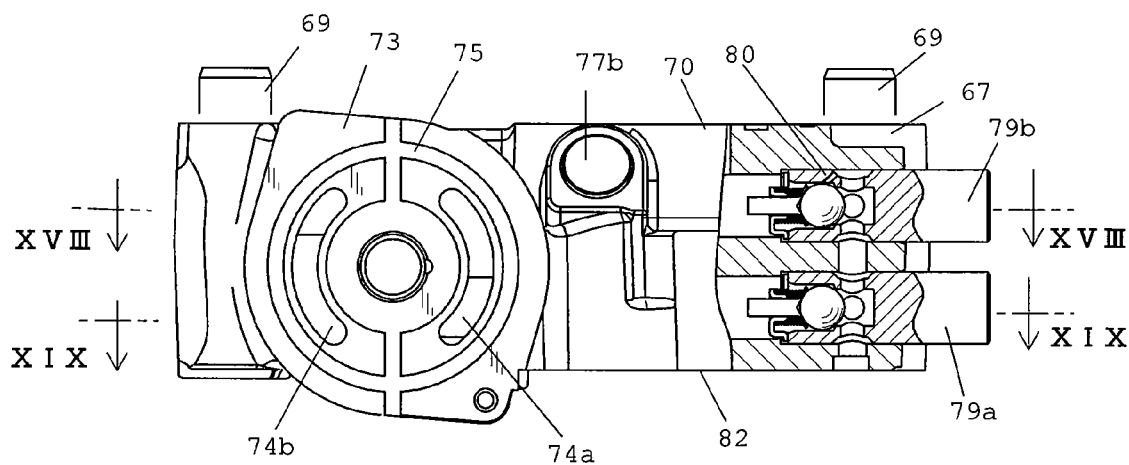
FIG. 16 illustrates a left side view of the center section in partial cross-section.
Figure 17:
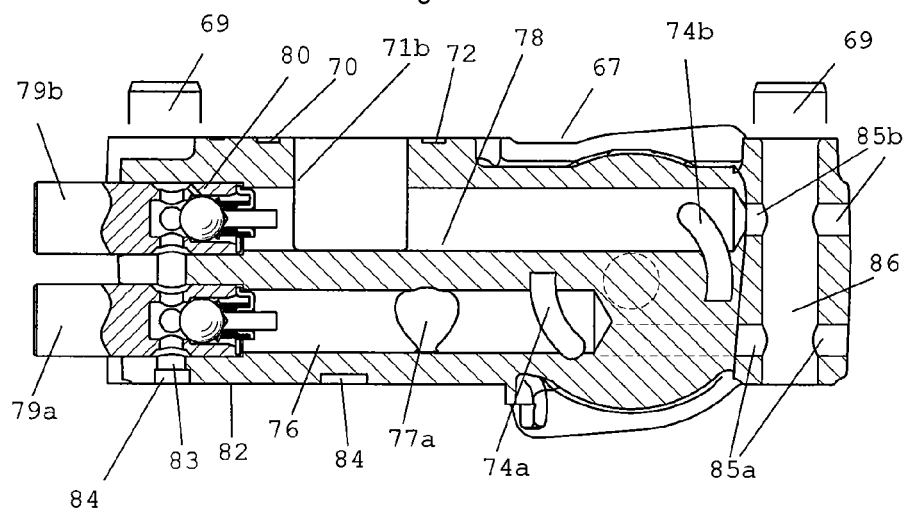
FIG. 17 illustrates a cross-sectional view taken along line XVII-XVII in FIG. 14 of the center section.
Figure 20:
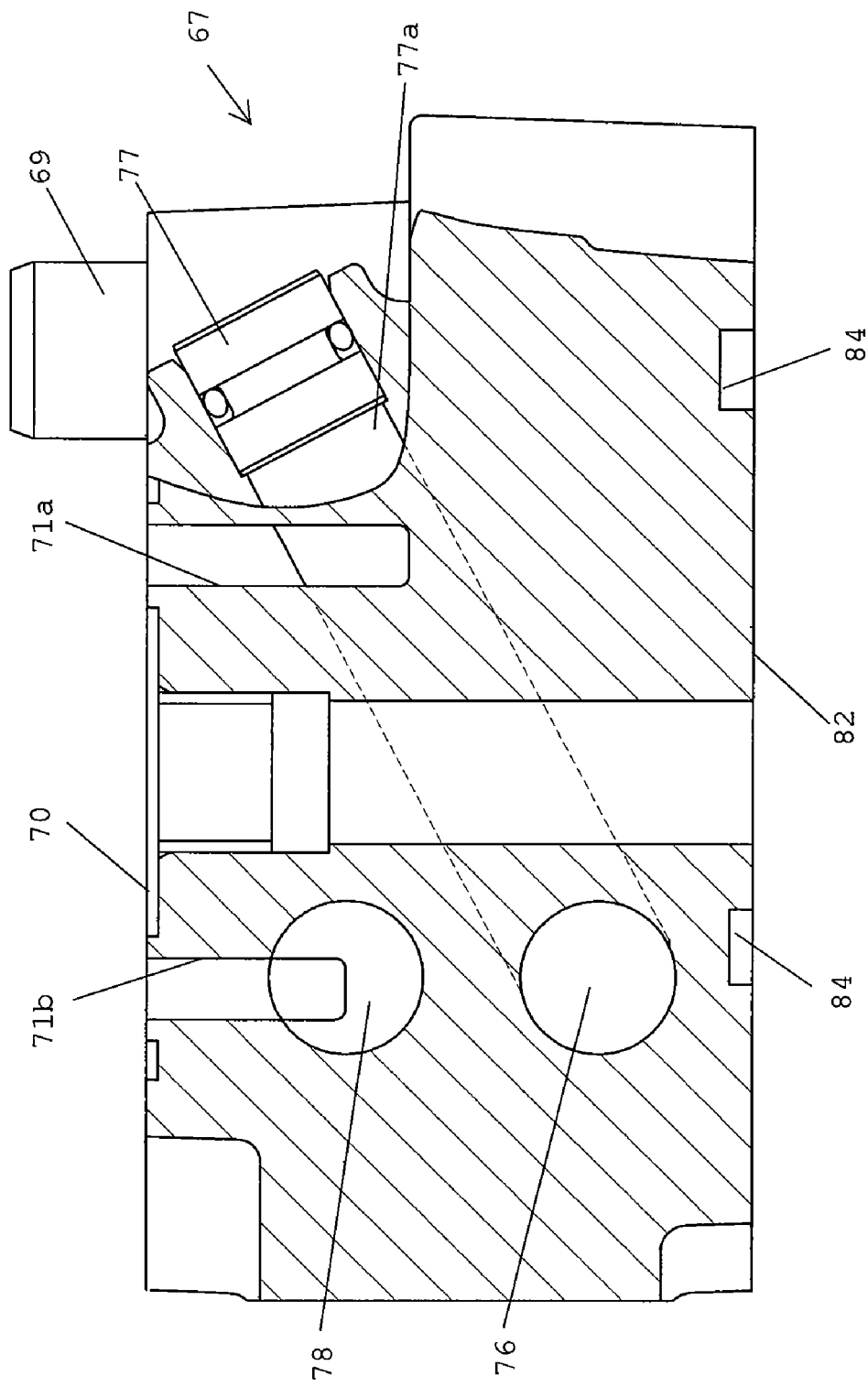
FIG. 20 illustrates a cross-sectional view taken along line XX-XX in FIG. 14 of the center section.

The hydraulic circuit for fluid flow between pump 50 and motor 60 will be described with reference to FIGS. 4 and 14-20. Pump mounting surface 70 on center section 67 has a pair of kidney-shaped ports 71a and 71b to take in or discharge oil in cylinder block 52 of pump 50 and a leak oil drain groove 72. Motor mounting surface 73 on center section 67 has a pair of kidney-shaped ports 74a and 74b to take in or discharge oil in cylinder block 62 of motor 60 and a leak oil drain groove 75. In order to establish fluid communication between port 71a and port 74a a tilt oil passage 77a is provided in center section 67 that connects port 71a to a first oil passage 76 in center section 67. Port 74a is also connected to first oil passage 76. Tilt oil passage 77a has an end that opens to the surface of center section 67 but is provided with a lid 77b to close the end. In order to establish fluid communication between port 71b and 74b a second oil passage 78 is provided in center section 67, which connects ports 71b and 74b. First oil passage 76 has a first charge check valve 79a and second oil passage 78 has a second charge check valve 79b. Stopper ribs 81U and 81L are disposed within housing 20 adjacent charge check valves 79b and 79a, respectively, as shown in FIGS. 6, 10, and 11. The end surfaces of the charge check valves 79b and 79a contact each stopper ribs 81U and 81L so that charge check valves 79b and 79a never fall out from center section 67. Accordingly, a closed hydraulic circuit is defined to circulate the operating oil between hydraulic pump 50 and hydraulic motor 60.

Operation of pump 50 causes one of first oil passage 76 or second oil passage 78 to be under high pressure. When first oil passage 76 is under high pressure first charge check valve 79a is also under high pressure and its outlet is closed by its ball valve. Similarly, when second oil passage 78 is under high pressure second charge check valve 79b is also under high pressure and its outlet is closed by its ball valve. When one of first and second charge check valves 79a or 79b is under high pressure the other of first and second charge check valves 79a or 79b is under low pressure and the inlet and outlet are connected and replenished with oil. Second charge check valve 79b, located in second oil passage 78, is under high pressure when vehicle 1 is traveling in reverse. Second charge check valve 79b has an orifice 80 that bypasses the inlet and outlet and thereby broadens the area of the neutral band of pump 50.

Figure 9:
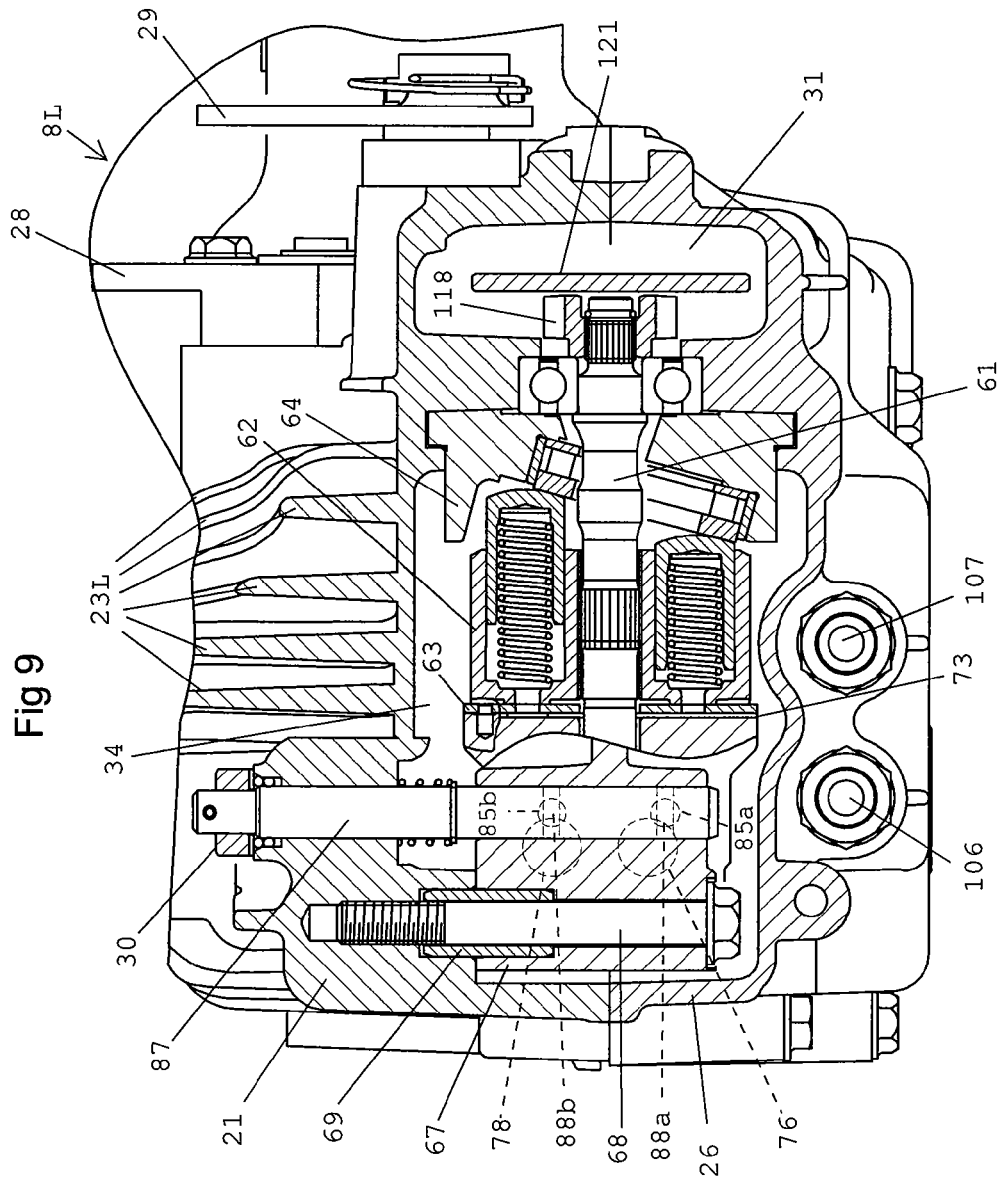
FIG. 9 illustrates a cross-sectional view taken along line IX-IX in FIG. 5 of the left transaxle.

As best seen in FIG. 9, one end of each of first oil passage 76 and second oil passage 78 lead to drain ports 85a and 85b, respectively. Drain ports 85a and 85b run parallel to each other and are connected via a shaft hole 86 that runs perpendicular to and intersects both drain ports 85a and 85b. A rotary bypass valve including a rotary bypass shaft 87 is disposed within shaft hole 86. Rotary bypass shaft has oil holes 88a and 88b, which are positioned to align with drain ports 85a and 85b, respectively. Rotary bypass shaft 87 extends from center section 67 and from upper housing 21 and has a bypass arm 30 attached to its end.

The rotary bypass valve is switchably operated between a shutoff position and a communication position by rotating rotary bypass shaft 87 ninety degrees with bypass arm 30 about the axis of rotary bypass shaft 87. In the shutoff position, oil holes 88a and 88b are not in communication with drain ports 85*a* and 85*b*. In the communication position oil holes 88*a* and 88*b* are in communication with drain ports 85*a* and 85*b*. Therefore when the transaxle 8L is in traction, it is easy to keep the axle shaft 9L free-wheeling by operating bypass arm 30.

Center section 67 also has a charge pump case mounting surface 82 opposite to pump mounting surface 70 for mounting a hydraulic PTO unit having a charge pump 90. Charge pump case mounting surface 82 has a charge port 83 that leads to a passage connected to an inlet of first and second charge check valves 79*a* and 79*b* and an oil groove 84.

Charge pump 90, as shown in FIGS. 6, 8, 11, and 12 is a pump which is contained in a charge pump casing 91 attached to charge pump case mounting surface 82 of center section 67 through bolts 92. Pump shaft 51 extends through charge pump casing 92 and drives charge pump 90. Charge pump 90 is in fluid communication with first and second oil passages 76 and 78 through first and second charge check valves 79*a* and 79*b* and charge port 83.

Charge pump 90 has an inner rotor 93 disposed about pump shaft 51 and has a joint pin 94 that extends through an opening in pump shaft 51 and is attached at its ends to inner rotor 93. An outer rotor 95 is disposed about inner rotor 93. Oil groove 84 in center section 67 is aligned with an oil groove 98 in charge pump casing 91. Oil groove 98 has an oil hole 99 that leads to an inlet auxiliary port 107. Oil groove 98 also has an oil hole 101 that drains oil when an implement relief valve 100 adjusts the pressure of discharge port 97. Discharge port 97 of charge pump 90 is in communication with outlet auxiliary port 106. Oil groove 98 also has an oil hole 103. The oil flowing over oil groove 98 goes through oil hole 103 to charge relief valve 102. The oil discharged from charge relief valve 102 goes through drain hole 104 then flows down to an oil sump 34 at the bottom of charge pump casing 91. Charge pump 90 also has a suction port 96 that leads to oil sump 34. Oil groove 98 also has a suction valve 105 that is in communication with suction port 96. Suction valve 105 may act as a third check valve that prevents free-wheeling when vehicle 1 stops and comes to a halt.

Figure 4:
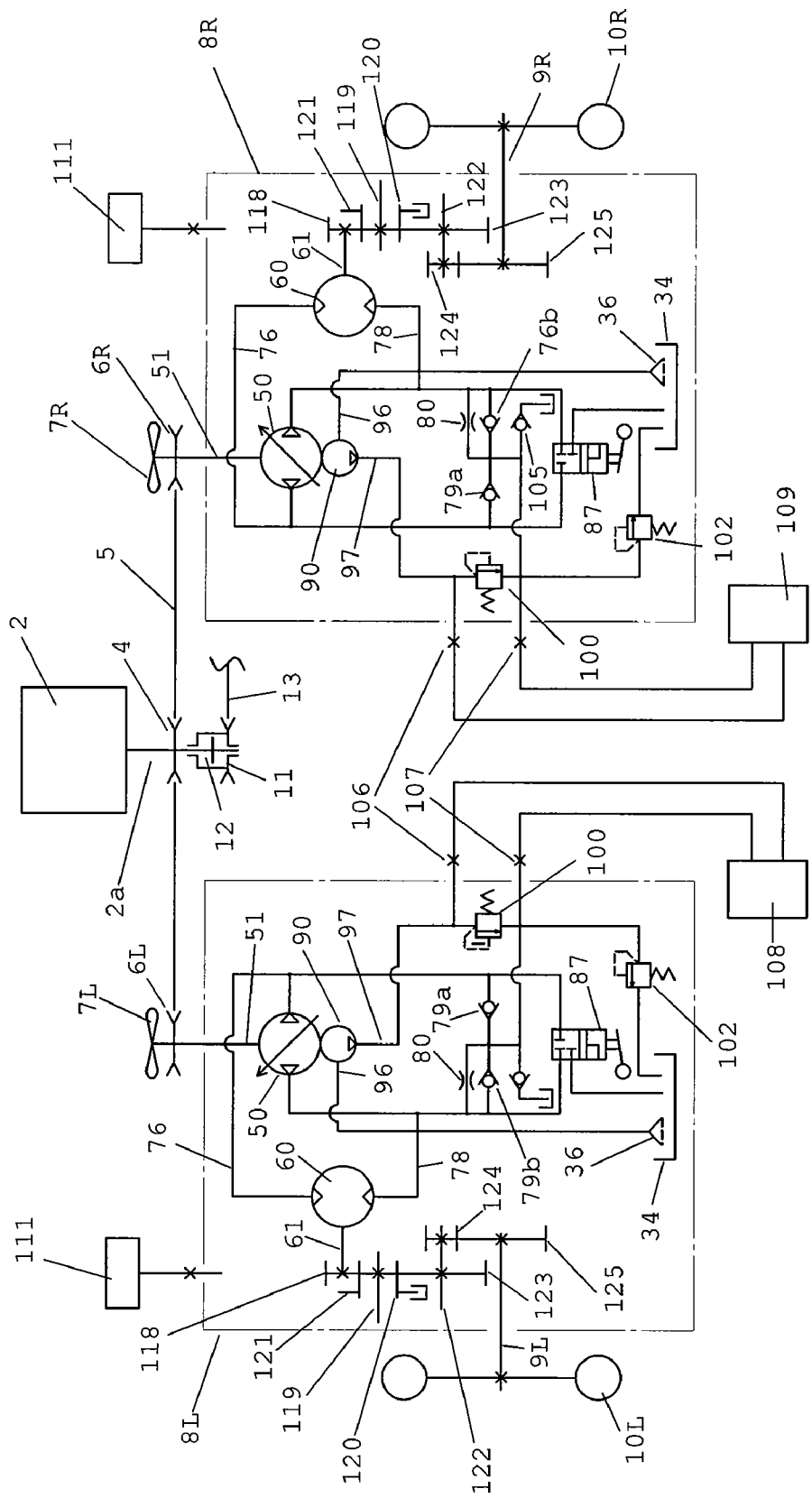
FIG. 4 illustrates a first embodiment of a hydraulic circuit diagram for a transaxle assembly.
Figure 26:
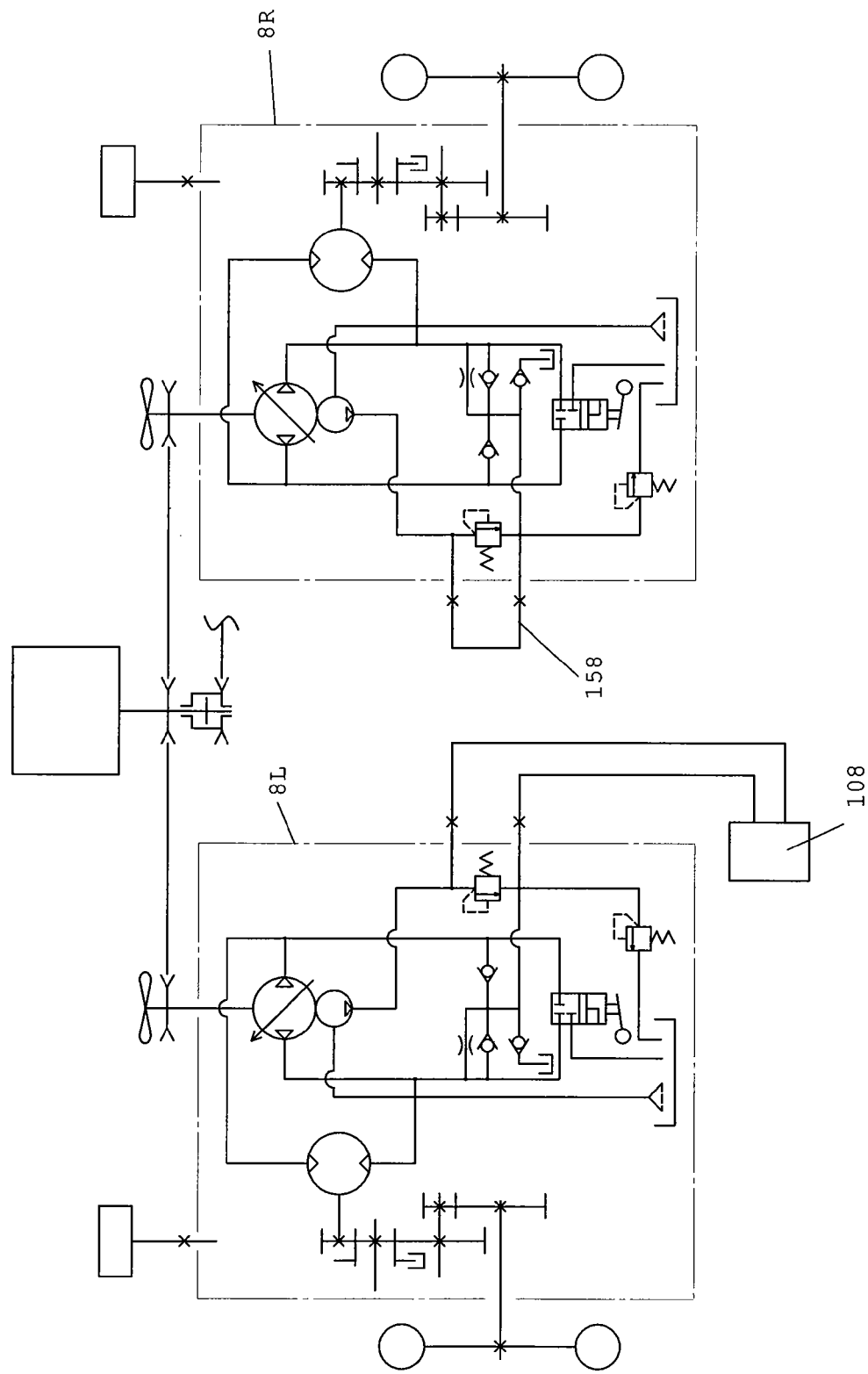
FIG. 26 illustrates a second embodiment of a hydraulic circuit diagram for a transaxle assembly.
Figure 27:
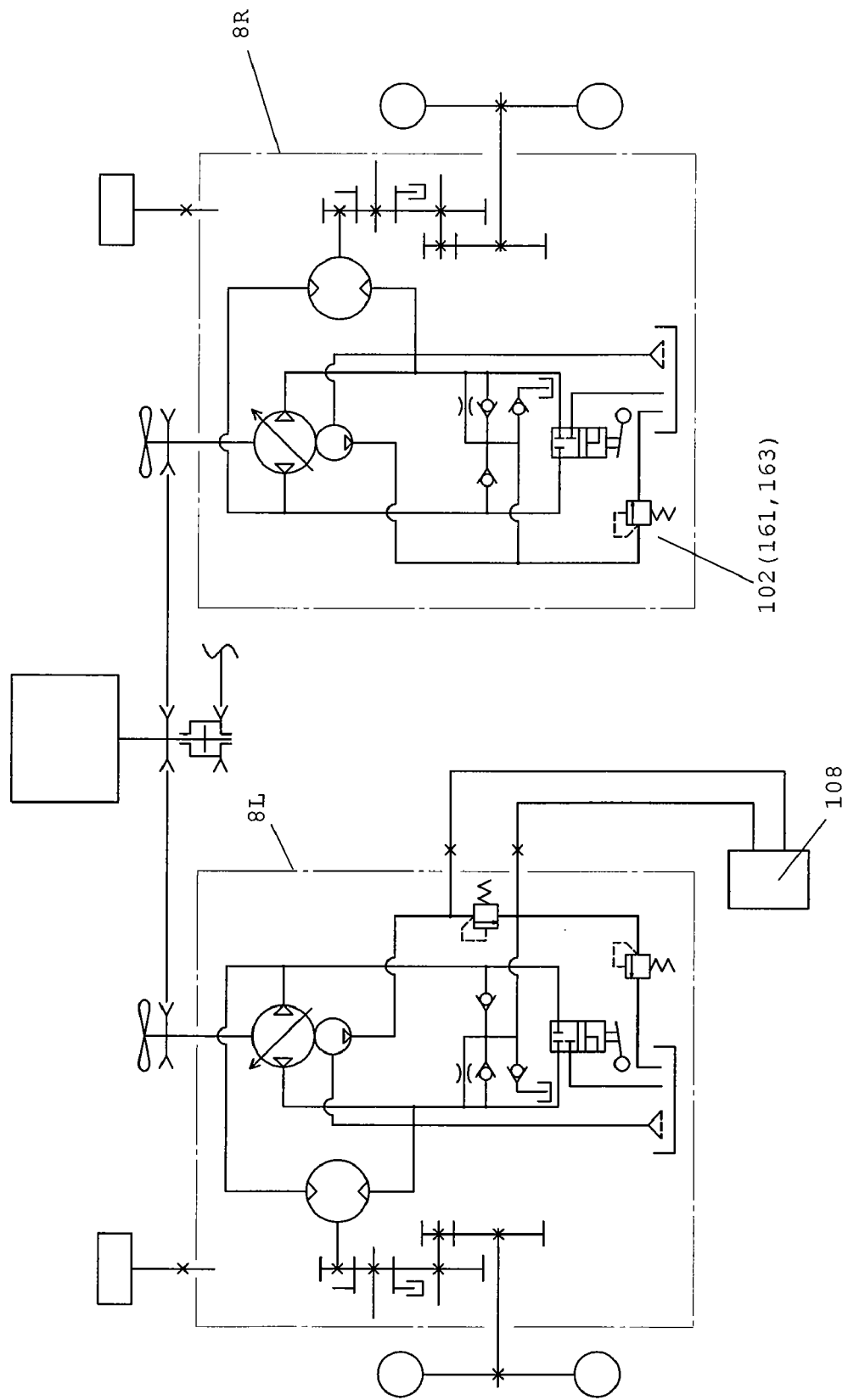
FIG. 27 illustrates a third embodiment of a hydraulic circuit diagram for a transaxle assembly, with a right transaxle and a left transaxle having a different hydraulic circuit.

As shown in FIG. 4, both transaxle 8L and 8R have charge pumps 90 with auxiliary ports 106 and 107. In transaxle 8L the auxiliary ports are open and connected to a hydraulic actuator 108 and in transaxle 8R the auxiliary ports are open and connected to a hydraulic actuator 109. Alternatively, transaxle 8R may have auxiliary ports that are closed off via a bypass conduit 158, as shown in FIG. 26 or transaxle 8R may not have auxiliary ports at all, as shown in FIG. 27. Transaxle 8R shown in FIGS. 26 is the same as transaxle 8L except for the presence of bypass conduit 58 and absence of a hydraulic actuator and transaxle 8R shown in FIG. 27 is the same as transaxle 8L except for the absence of auxiliary ports 106, 107 and a hydraulic actuator. Hydraulic actuator 108 for use as hydraulic equipment adjunct to working vehicle such as lift apparatus for mower.

Charge pump 90 serves to draw lubricating oil in oil sump 34 into charge pump 90 and ultimately into first and second oil passages 76 and 78 through first and second charge check valves 79*a* and 79*b*. As shown in FIG. 6, a detachable oil filter 36 is inserted into rear side opening 37 in housing 20. Once oil filter 36 is inserted into opening 37, opening 37 is sealed with lid 38. Oil filer 36 is in communication with suction valve 105 and suction port 96 of charge pump 90.

Figure 28:
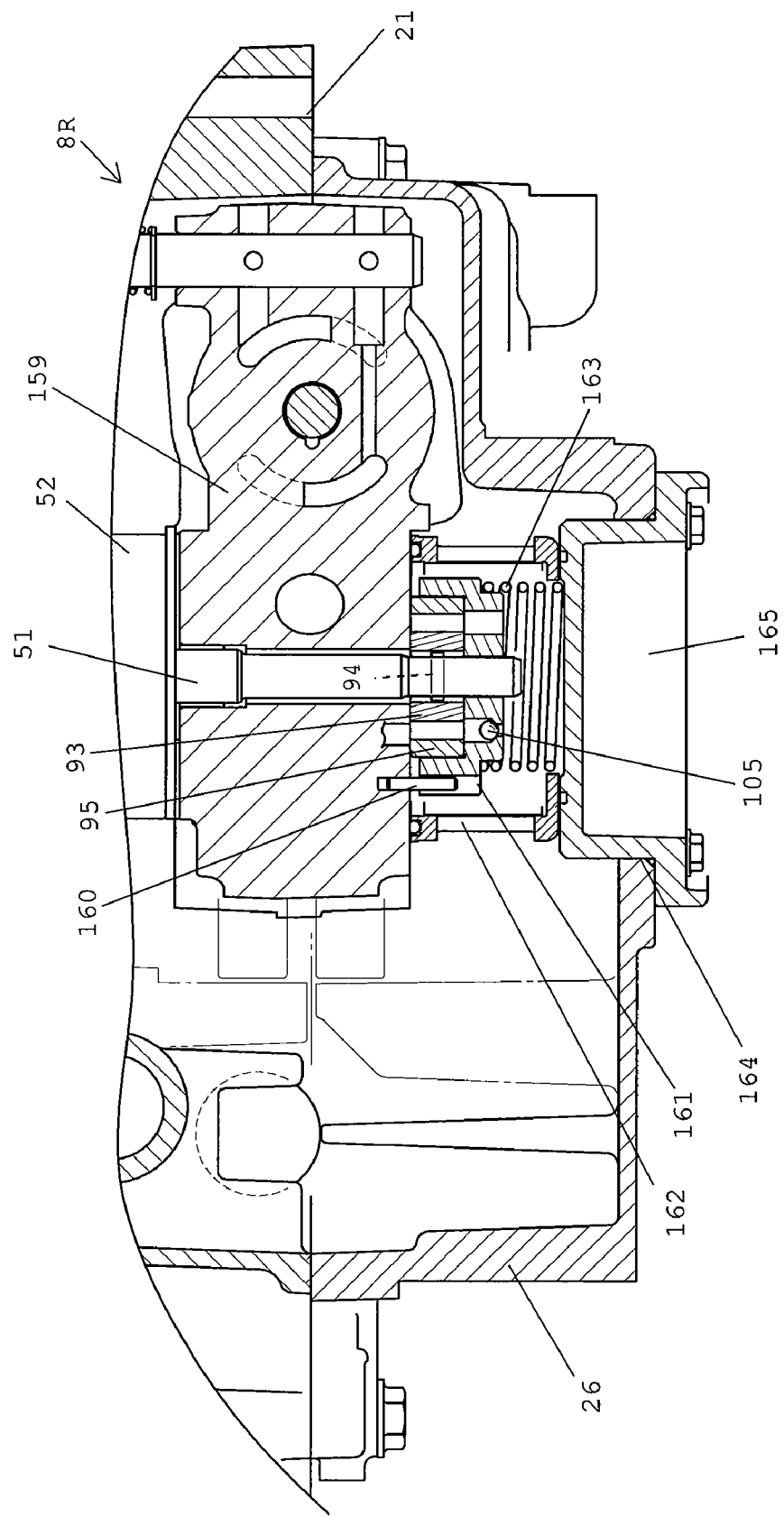
FIG. 28 illustrates a cross-sectional view of a transaxle illustrating a common housing material and a filter removable from a lower housing part.

Alternatively, as shown in FIG. 28, a detachable annular oil filter 162 is inserted in a bottom side opening 164 of housing 20. Once oil filter 162 is inserted into opening 164, opening 164 is sealed with lid 165. Charge pump case 161 is attached to center section 159 with a sliding guide pin 160. A spring 163 located between floating charge pump casing 161 and lid 165 and flexibly supports charge pump case 161 so it is floating within oil filter 162 on spring 163. Charge pump case 161 and spring 163 have a similar function as the charge relief valve 102 as set forth above.

Housing 20 has an oil sump 34 located therein and the hydraulic stepless speed change assembly is at least partially immersed in oil sump 34. Oil sump 34 is filled with oil for lubricating and operating the HST. As best seen in FIG. 7, reserve oil tank 111 may be disposed in a holder 116, which is attached to an outside surface of upper housing 21. Reserve tank 111 is filled with oil having a normal level 113 and has a cap 114 having a breather that communicates the interior of reserve tank 111 with the atmosphere. A fine tube or siphon 112 extends from a connector 115 into the oil in reserve tank 111. Connector 115 is attached to reserve tank 111 and is in communication with oil sump 34 through a vertical oil bore formed in upper housing 21. Siphon 112 allows for oil to flow between sump 34 and reserve tank 111.

As the volume of oil in oil sump 34 increases as the temperature of the oil increases during operation of the HST, the increased volume of oil is directed into reserve tank 111 through connector 115 and siphon 112. In addition, as the volume of oil in oil sump 34 decreases as the temperature of the oil decreases, the oil returns to oil sump 34 from reserve tank 111 through siphon 112 and connector 115.

As discussed above, housing 20 has a first chamber 31 housing a gear train, a second chamber 34 serving as an oil sump, and a third chamber 39, which is an opening located between first chamber 31 and second chamber 34. As best seen in FIGS. 5 and 13, the housing 20 utilizes a magnetic oil-cleaning assembly for cleaning the oil therein by removing metal shavings, generated through the chafing of the gears. First chamber 31 has a first magnet 32 preferably located near bull gear 125. Second chamber 34 has a second magnet 35 preferably located near oil filter 36. Third chamber 39 has a communicating bore 43 to first chamber 31 and a communicating bore 44 to second chamber 34 and a lid 41. Oil passes between first chamber 31 and second chamber 34 through third chamber 39. Third chamber 39 is an opening between first chamber 31 and second chamber 34 and has a third magnet 40 that sits in a seat plate 42.

The axle driving apparatus disclosed above is advantageous for use in a zero turn radius vehicle, but is not limited to such. It allows a lawn or garden tractor, or other vehicle, with the axle driving apparatus disposed therein to make zero radius turns and facilitates mowing close to trees or other obstacles.

While preferred embodiments have been shown and described, it will be understood that there is no intent to limit the invention to such disclosure, but rather it is intended to cover all modifications and alternate constructions falling within the spirit and scope of the invention as defined in the appended claims.

What is claimed is:

1. An axle driving apparatus for a vehicle, comprising:
   a first housing having a first plurality of cooling fins;
   a first axle, having a first longitudinal axis, rotatably mounted in the first housing;
   a first hydraulic stepless speed change assembly disposed within the first housing, the first hydraulic stepless speed change assembly including a first hydraulic pump having a first input shaft, said first input shaft having a rotational axis substantially perpendicular to said first axle, and including a first hydraulic motor having a first output shaft drivingly connected to said first axle;
   a second housing having a second plurality of cooling fins;

a second axle, having a second longitudinal axis, rotatably mounted in the second housing;
a second hydraulic stepless speed change assembly disposed within the second housing, the second hydraulic stepless speed change assembly including a second hydraulic pump having a second input shaft, said second input shaft having a rotational axis substantially perpendicular to said second axle, and including a second hydraulic motor having a second output shaft drivingly connected to said second axle; and
a connecting means connecting the first and second housings;
wherein the first plurality of cooling fins and the second plurality of cooling fins have different configurations.

2. The axle driving apparatus of claim 1, wherein the first plurality of cooling fins are bent at an angle different from an angle at which the second plurality of cooling fins are bent.

3. The axle driving apparatus of claim 1, further comprising:
a first hydraulic PTO unit having a first charge pump, wherein the first hydraulic PTO unit is connected to a first plurality of auxiliary ports in the first housing.

4. The axle driving apparatus of claim 3, wherein the second housing has a second plurality of auxiliary ports.

5. The axle driving apparatus of claim 4, further comprising a second hydraulic PTO unit having a second charge pump, wherein the second hydraulic PTO unit is connected to the second plurality of auxiliary ports.

6. The axle driving apparatus of claim 4, wherein the second plurality of auxiliary ports are closed off.

7. The axle driving apparatus of claim 1, further comprising:
a first input pulley disposed on the first input shaft; and
a second input pulley disposed on the second input shaft.

8. The axle driving apparatus of claim 7, further comprising:
a first spline collar surrounding the first input shaft;
a first bearing support surrounding the first spline collar;
a second spline collar surrounding the second input shaft; and
a second bearing support surrounding the second spline collar;
wherein the first input pulley is disposed on the first bearing support and the second input pulley is disposed on the second bearing support.

9. The axle driving apparatus of claim 1, further comprising:
a first input pulley;
a first cooling fan mounted on the first input shaft;
a first wave washer located between the first input pulley and the first cooling fan;
a second input pulley;
a second cooling fan mounted on the second input shaft; and
a second wave washer located between the second input pulley and the second cooling fan.

10. The axle driving apparatus of claim 1, further comprising:
a first oil sump formed in the first housing, wherein the first hydraulic stepless speed change assembly is at least partially immersed in the first oil sump;
a first reserve tank;
a first siphon allowing flow in both directions between the first oil sump and the first reserve tank;
a second oil sump formed in the second housing, wherein the second hydraulic stepless speed change assembly is at least partially immersed in the second oil sump;
a second reserve tank; and
a second siphon allowing flow in both directions between the second oil sump and the second reserve tank.

11. The axle driving apparatus of claim 1, further comprising:
a first detachable oil filter associated with the first housing; and
a second detachable oil filter associated with the second housing.

12. The axle driving apparatus of claim 11, further comprising:
a first removable lid for accessing the first detachable oil filter; and
a second removable lid for accessing the second detachable oil filter.

13. The axle driving apparatus of claim 11 wherein the first detachable oil filter is positioned on a bottom surface of a first housing and the second detachable oil filter is positioned on a bottom surface of a second housing.

14. The axle driving apparatus of claim 11 wherein the first detachable oil filter is positioned on a rear side of a first housing and the second detachable oil filter is positioned on a rear side of a second housing.

15. The axle driving apparatus of claim 1 wherein:
the first hydraulic pump is mounted within the first housing a first preselected distance from the first axle and the first hydraulic motor is mounted within the first housing a second preselected distance from the first axle, the second preselected distance being greater than the first preselected distance; and
the second hydraulic pump is mounted within the second housing a third preselected distance from the second axle and the second hydraulic motor is mounted within the second housing a fourth preselected distance from the second axle, the fourth preselected distance being greater than the third preselected distance.

16. The axle driving apparatus of claim 1, further comprising:
a first rotary bypass valve assembly disposed in the first housing, the first rotary bypass valve assembly including:
a first rotary shaft having a first end extending from the housing and at least two oil holes; and
including a first bypass arm connected to the first end of the first rotary shaft for rotating the first rotary shaft to connect and disconnect the at least two oil holes with oil drain ports connected to the first hydraulic motor; and
a second rotary bypass valve assembly disposed in the second housing, the second rotary bypass valve assembly including:
a second rotary shaft having a first end extending from the second housing and at least two oil holes; and
including a second bypass arm connected to the first end of the second rotary shaft for rotating the second rotary shaft to connect and disconnect the at least two oil holes with oil drain ports connected to the second hydraulic motor.

17. The axle driving apparatus of claim 1, wherein:
the first hydraulic stepless speed change assembly includes a first counter shaft with a first braking mechanism; and
the second hydraulic stepless speed change assembly includes a second counter shaft with a second braking mechanism.

18. The axle driving apparatus of claim 17, wherein:
the first hydraulic stepless speed change assembly further comprises a third counter shaft; and the second hydraulic stepless speed change assembly further comprises a fourth counter shaft.

19. The axle driving apparatus of claim 1, further comprising:
a first magnet located in the first housing;
a second magnet located in the first housing;
a third magnet located in the first housing;
a fourth magnet located in the second housing;
a fifth magnet located in the second housing; and
a sixth magnet located in the second housing.

20. The axle driving apparatus of claim 19, wherein:
the first housing has a first chamber, a second chamber and an opening between the first chamber and the second chamber;
the first magnet is located in the first chamber;
the second magnet is located in the second chamber; and
the third magnet is located in the opening between the first chamber and the second chamber;
the second housing has a third chamber, a fourth chamber and an opening between the third chamber and the fourth chamber;
the fourth magnet is located in the third chamber;
the fifth magnet is located in the fourth chamber; and
the sixth magnet is located in the opening between the third chamber and the fourth chamber.

21. The axle driving apparatus of claim 1, further comprising:
a first check valve located in the first speed change assembly;
a second check valve located in the first speed change assembly;
a third check valve located in the first speed change assembly;
a fourth check valve located in the second speed change assembly;
a fifth check valve located in the second speed change assembly; and
a sixth check valve located in the second speed change assembly.

22. The axle driving apparatus of claim 21, wherein:
the first check valve is located in a first oil passage in the first hydraulic pump and the second check valve is located in a second oil passage in the first hydraulic pump; and
the fourth check valve is located in a third oil passage in the second hydraulic pump and the fifth check valve is located in a fourth oil passage in the second hydraulic pump.

23. The axle driving apparatus of claim 22, further comprising:
a first charge pump with a first oil groove, wherein the third check valve is located in the first oil groove; and
a second charge pump with a second oil groove, wherein the sixth check valve is located in the second oil groove.

24. The axle driving apparatus of claim 1, wherein the connecting means is a bar and/or a plate.

25. An axle driving apparatus for a vehicle, comprising:
a housing;
a single axle, having a longitudinal axis, rotatably mounted in the housing;
a hydraulic stepless speed change assembly disposed within the housing, the speed change assembly including a hydraulic pump having an input shaft projecting from the housing, the input shaft having a rotational axis substantially perpendicular to the single axle, and including a hydraulic motor having an output shaft drivingly connected to the single axle;
an input pulley disposed on the input shaft;
a spline collar surrounding the input shaft; and
a bearing support surrounding the spline collar, wherein the input pulley is disposed on the bearing support.

26. The axle driving apparatus of claim 25, further comprising:
a cooling fan mounted on the input shaft; and
a wave washer located between the input pulley and the cooling fan.

* * * * *